US010781685B2

(12) United States Patent
Wu et al.

(10) Patent No.: US 10,781,685 B2
(45) Date of Patent: Sep. 22, 2020

(54) APPARATUS AND METHOD FOR ALIGNING DOWNHOLE MEASUREMENTS

(71) Applicant: Halliburton Energy Services, Inc., Houston, TX (US)

(72) Inventors: Hsu-Hsiang Wu, Sugar Land, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 473 days.

(21) Appl. No.: 15/198,631

(22) Filed: Jun. 30, 2016

(65) Prior Publication Data
US 2016/0312600 A1 Oct. 27, 2016

Related U.S. Application Data

(63) Continuation of application No. 14/399,803, filed as application No. PCT/US2013/078097 on Dec. 27, 2013.

(51) Int. Cl.
E21B 47/04 (2012.01)
G01V 3/28 (2006.01)
E21B 47/024 (2006.01)
E21B 47/13 (2012.01)
E21B 49/00 (2006.01)
G01V 3/26 (2006.01)

(52) U.S. Cl.
CPC ............ E21B 47/04 (2013.01); E21B 47/024 (2013.01); E21B 47/13 (2020.05); E21B 49/00 (2013.01); G01V 3/26 (2013.01); G01V 3/28 (2013.01)

(58) Field of Classification Search
CPC ...................................................... E21B 47/04
See application file for complete search history.

(56) References Cited

U.S. PATENT DOCUMENTS

| 4,472,684 | A | 9/1984 | Schuster |
| 4,687,995 | A | 8/1987 | Warren et al. |
| 5,654,938 | A | 8/1997 | Tang |
| 5,726,951 | A | 3/1998 | Birchak et al. |
| 5,917,160 | A | 6/1999 | Bailey |

(Continued)

FOREIGN PATENT DOCUMENTS

| CN | 102870014 | 12/2015 |
| WO | WO-2008076130 A1 | 6/2008 |

(Continued)

OTHER PUBLICATIONS

"Canadian Application Serial No. 2,929,219, Office Action dated Mar. 31, 2017.", 4 pages.

(Continued)

Primary Examiner — John E Breene
Assistant Examiner — Jeffrey C Morgan
(74) Attorney, Agent, or Firm — Gilliam IP PLLC

(57) ABSTRACT

Apparatuses and methods are described, such as for aligning downhole measurements. Apparatuses and methods include an arrangement of at least two tilted transmitters and at least one tilted receiver along a longitudinal axis of the tool. A first and second plurality of azimuthal measurements are processed to provide a first and a second plurality of higher order mode signals configured to be time-shifted.

33 Claims, 14 Drawing Sheets

(56) References Cited

U.S. PATENT DOCUMENTS

| | | | |
|---|---|---|---|
| 6,163,155 | A | 12/2000 | Bittar |
| 6,618,674 | B2 | 9/2003 | Ireland et al. |
| 7,019,528 | B2 * | 3/2006 | Bittar ................. G01V 3/28 |
| | | | 324/337 |
| 8,195,397 | B2 | 6/2012 | Blanz |
| 8,417,455 | B2 | 4/2013 | Zhong et al. |
| 2003/0024305 | A1 | 2/2003 | Ireland et al. |
| 2006/0203614 | A1 | 9/2006 | Harmon |
| 2007/0263488 | A1 | 11/2007 | Clark |
| 2010/0114494 | A1 | 5/2010 | Higginbotham et al. |
| 2012/0105076 | A1 | 5/2012 | Li et al. |
| 2012/0283951 | A1 | 11/2012 | Li et al. |
| 2013/0141102 | A1 | 6/2013 | Donderici et al. |
| 2013/0248250 | A1 | 9/2013 | Bittar et al. |
| 2013/0285665 | A1 | 10/2013 | Wu et al. |
| 2013/0311094 | A1 | 11/2013 | Donderici et al. |
| 2015/0285061 | A1 | 10/2015 | Wu et al. |

FOREIGN PATENT DOCUMENTS

| | | |
|---|---|---|
| WO | WO-2011129828 A1 | 10/2011 |
| WO | WO-2012/030327 | 3/2012 |
| WO | WO-2012030327 A1 | 3/2012 |
| WO | WO-PCT/US2013/054879 | 8/2013 |
| WO | WO-2015099783 A1 | 7/2015 |

OTHER PUBLICATIONS

"Australian Application Serial No. 2013408802, First Examiner Report dated Aug. 2, 2016", 2 pgs.

"European Application Serial No. 13900350.3, Extended European Search Report dated Jul. 1, 2016", 9 pgs.

"International Application Serial No. PCT/US2013/078097, International Preliminary Report on Patentability dated Jul. 7, 2016", 8 pgs.

EP Application Serial No. 13 900 350.3-1559, Communication Pursuant to Article 94(3) EPC, dated Nov. 24, 2017,6 pgs.

"U.S. Appl. No. 14/399,803, Final Office Action dated Jun. 1, 2016", 24 pgs.

"U.S. Appl. No. 14/399,803, Non Final Office Action dated Oct. 9, 2015", 22 pgs.

"U.S. Appl. No. 14/399,803, Response dated Apr. 8, 2016 to Non Final Office Action dated Oct. 9, 2015", 14 pgs.

"European Application Serial No. 13900350.3, Office Action dated Apr. 14, 2016", 2 pgs.

"International Application Serial No. PCT/US2013/078097, International Search Report dated Sep. 25, 2014", 4 pgs.

"International Application Serial No. PCT/US2013/078097, Written Opinion dated Sep. 25, 2014", 6 pgs.

Chinese Application Serial No. 201380080959.4; First Office Action; dated Sep. 18, 2018, 20 pages.

Indonesian Application Serial No. P-00201602827; Notice of Allowance to Grant; dated May 22, 2019, 4 pages.

Indian Application Serial No. 201617013888; First Examination Report; dated May 14, 2019, 5 pages.

Indonesian Application Serial No. P-00201602827; Office Action; dated Dec 13, 2018, 4 pages.

CN Application Serial No. 201380080959.4, Second Office Action, dated Jul. 15, 2019, 22 pages.

U.S. Appl. No. 14/399,803, filed Nov. 7, 2014, Apparatus and Method for Aligning Downhole Measurements.

* cited by examiner

APPARATUS AND METHOD FOR ALIGNING DOWNHOLE MEASUREMENTS

PRIORITY APPLICATIONS

This application is a continuation of U.S. Ser. No. 14/399,803, filed 7 Nov. 2014 which was a U.S. National Stage Filing under 35 U.S.C. 371 from International Application No. PCT/US2013/078097, filed on 27 Dec. 2013, the applications are incorporated herein by reference in their entirety.

TECHNICAL FIELD

The present invention relates generally to systems having well logging capability.

BACKGROUND

In drilling wells for oil and gas exploration, understanding the structure and properties of the geological formation surrounding a borehole provides information to aid such exploration. Further, during drilling operations determining a depth of the borehole assembly (BHA) can be an important factor. The usefulness of such measurements can be related to the precision or quality of the measurement, so as to derive accurate formation information.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Apparatus and methods are described, such as for aligning downhole signals, including real-time electromagnetic measurements. A tool having at least two tilted transmitters and at least one tilted receiver in communication with the at least two tilted transmitters, configuration can transmit and receive multiple signals in real-time. The tool can further be configured such that a fixed physical separation between the tilted transmitter and tilted receiver of each antenna set is selected for all antenna sets, as well as each tilted antenna set is a known distance from other antenna sets, wherein an antenna set includes at least one tilted transmitter and at least one tilted receiver. In an example, one tilted antenna set with a tilted transmitter and a tilted receiver can be a known distance from a depth measurement device, such as a depth measurement device at a drill bit. In addition, the antenna set can be a known distance from another antenna set with a tilted transmitter and a tilted receiver.

The present inventors have recognized, among other things, that a problem to be solved can include current methods of measuring formation properties or depth during drilling operations, such as by a device at or near a drill bit, that introduce error, particularly in real-time. For example, a tool having a tilted antenna design can provide real-time signals, such as amplitude, which can then be manipulated in time-domain so as to provide an accurate formation property measurement or a depth measurement in real-time, as compared to previous methods.

Figure 1:
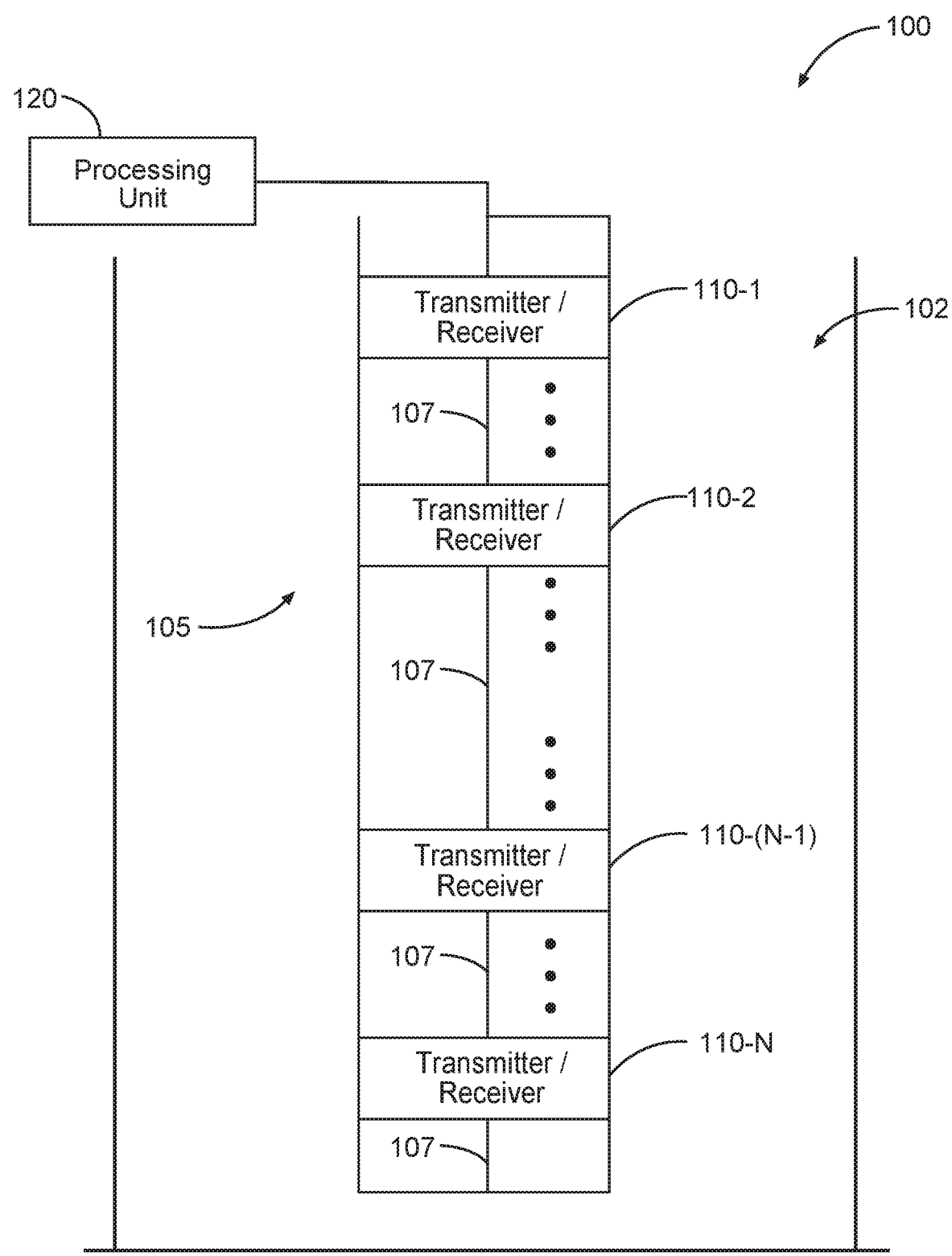
FIG. 1 illustrates a block diagram of an embodiment an apparatus having a processing unit and a tool to determine properties downhole in a well, according to various embodiments.

FIG. 1 shows a block diagram of an embodiment of an apparatus 100 having a processing unit 120 and a tool 105 to determine properties downhole in a well 102, such as a depth of the tool 105 in the well 102. Tool 105 has an arrangement of transmitters and receivers 110-1, 110-2 . . . 110-(N−1), 110-N to operate in conjunction with processing unit 120 to take real-time signals from the transmitters and receivers 110-1, 110-2 . . . 110-(N−1), 110-N to determine the depth of the 105. Equivalent, similar, or identical control and processing of arrangements of transmitters and receivers, as disclosed in various embodiments herein, provide a mechanism for these arrangements to align signals of the transmitters and receivers 110-1, 110-2 . . . 110-(N−1). 110-N, such as in the time-domain. Although FIG. 1 shows multiple transmitters and receivers, in an example the tool 105 can include at least two transmitters and one receiver, such that the one receiver can provide multiple signals (e.g., from the at least two transmitters).

In an embodiment, an arrangement of transmitters and receivers 110-1, 110-2 . . . 110-(N−1), 110-N can operate in conjunction with processing unit 120 to provide a depth measurement correlating a position of a first transmitter 110-1, 110-2 . . . 110-(N-1), 110-N and a position of a second transmitter 110-1, 110-2 . . . 110-(N-1), 110-N. Transmitters and receivers 110-1, 110-2 . . . 110-(N-1), 110-N can be oriented with respect to longitudinal axis 107 of tool 105. Each of the transmitters and receivers 110-1, 110-2 . . . 110-(N-1), 110-N can be tilted with respect to longitudinal axis 107. For example, each of the transmitters and receivers 110-1, 110-2 . . . 110-(N-1), 110-N can be tilted with respect to longitudinal axis 107, such as an angle non-parallel to the longitudinal axis 107 (e.g., not 0 degrees). Each sensor element (i.e., transmitters and receivers) in arrangement of transmitters and receivers 110-1, 110-2 . . . 110-(N-1), 110-N can be realized as a coil element, a tilted coil element, a wire element, a toroidal element, a solenoid element, an electrode type element, a transducer, or other appropriate electromagnetic based sensor. The selected sensors may operate in various frequency ranges.

In an embodiment, an arrangement of transmitters and receivers 110-1, 110-2 . . . 110-(N-1), 110-N can operate in conjunction with a processing unit 120 to provide a depth measurement correlating a position of a first transmitter 110-1, 110-2 . . . 110-(N-1), 110-N and a position of a second transmitter 110-1, 110-2 . . . 110-(N-1), 110-N in time domain so as to adjust (e.g., correct) real-time depth, higher order mode, or formation property measurements between two or more bottom hole assembly (BHA) positions. In such an embodiment, the apparatus can provide a more accurate depth measurement or formation property measurement for field operators, such as in real-time.

Processing unit 120 provides signals to selectively or continually activate transmitters and acquire measurement signals at the arrangement of transmitters and receivers 110-1, 110-2 . . . 110-(N-1), 110-N. The processing unit 120 can be located downhole, such as at the tool 105 or drill bit. In an example, the processing unit 120 can be at a surface. Processing unit 120 can control activation of the transmitters of tool 105 and can acquire and process signals received from the receivers and transmitters in tool 105 in real-time. In such examples, "real-time" includes common delays associated with transmitting signals from the well 102 to the processing unit 120, such as material or physical property delay attributes. As discussed herein, signals or measurements include electromagnetic measurements.

Processing unit 120 can be located at the surface of well 102 operably in communication with tool 105 via a communication mechanism. Such a communication mechanism can be realized as a communication vehicle that is standard for well operations. Processing unit 120 can be distributed along the mechanism by which tool 105 is placed downhole in well 102. Processing unit 120 can be integrated with tool 105 such that processing unit 120 is operable downhole in well 102. Processing unit 120 can be distributed along tool 105 or along a structure that delivers tool 105 downhole.

In various embodiments, a processing methodology operatively aligns real-time signals without a dedicated depth measurement sensor. The tool 105 can be used as a measurements-while-drilling (MWD) tool such as a logging-while-drilling (LWD) tool. In addition, the tool 105 can be adapted as a wireline tool.

Figure 2:
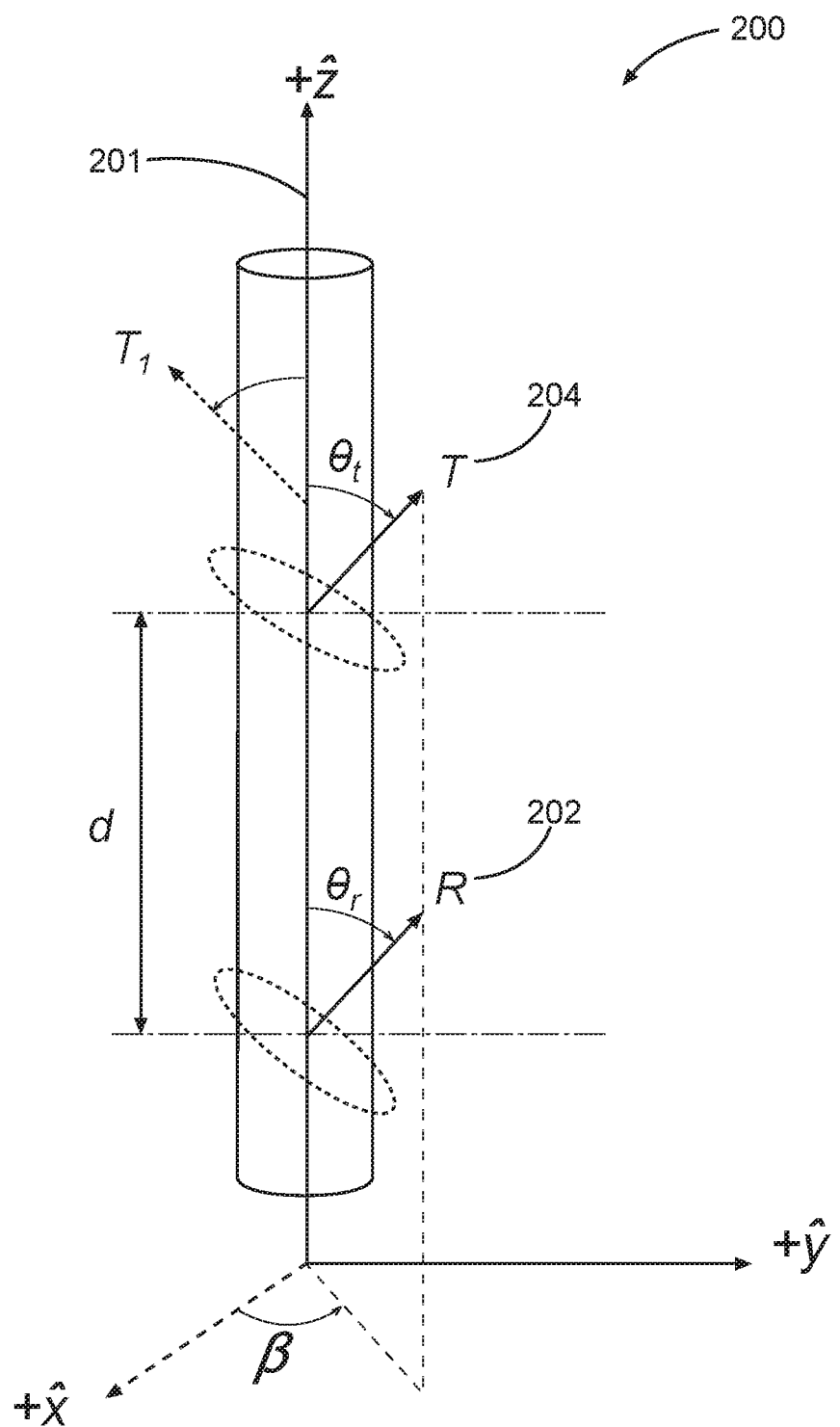
FIG. 2 illustrates a tool having a tilted antenna design configuration such that multi-component measurements can be taken at any non-zero tilt angle for a transmitter and a receiver, according to various embodiments.

FIG. 2 illustrates a logging tool 200 (e.g., antenna) with a tilted antenna design. The antenna 200 can be equipped in a rotating LWD or wireline tool. While firing the transmitter antenna 204, the signal measured received at the titled receiver 202 of FIG. 2 can be expressed in terms of the signal voltage $V_R^T$. Voltage responses of azimuthal signals at the tilted receiver 202 in response to a firing of a tilted transmitter 204 can be given by Eq. (1), expressed as:

$$V_R^T(\beta) = \left[\left(\frac{C_{xx}}{2} - \frac{C_{yy}}{2}\right)\cos 2\beta + \left(\frac{C_{yx} + C_{xy}}{2}\right)\sin 2\beta\right] + [(C_{zx} + C_{xz})\cos\beta + (C_{zy} + C_{yz})\sin\beta] + \left(C_{zz} + \frac{C_{xx}}{2} + \frac{C_{yy}}{2}\right) = V_{double}(\beta) + V_{single}(\beta) + V_{const} \quad (1)$$

where,
$C_{xx}=V_{xx}\sin\theta_t\sin\theta_r$; $C_{xy}=V_{xy}\sin\theta_t\sin\theta_r$; $C_{xz}=V_{xz}\sin\theta_t\cos\theta_r$;
$C_{yx}=V_{yx}\sin\theta_t\sin\theta_r$; $C_{yy}=V_{yy}\sin\theta_t\sin\theta_r$; $C_{yz}=V_{yz}\sin\theta_t\cos\theta_r$;
$C_{zx}=V_{zx}\cos\theta_t\sin\theta_r$; $C_{zy}=V_{zy}\cos\theta_t\cos\theta_r$; $C_{zz}=V_{zz}\cos\theta_t\cos\theta_r$;
and where, $$V_{double}(\beta) = \left(\frac{C_{xx}}{2} - \frac{C_{yy}}{2}\right)\cos 2\beta + \left(\frac{C_{yx} + C_{xy}}{2}\right)\sin 2\beta$$

$$V_{single}(\beta) = (C_{zx} + C_{xz})\cos\beta + (C_{zy} + C_{yz})\sin\beta$$

$$V_{const} = C_{zz} + \frac{C_{xx}}{2} + \frac{C_{yy}}{2}$$

Further, where $\beta$ is the tool azimuth, $\theta_t$ is the tilt angle of the transmitter related to the z-axis 201, $\theta_r$ is the tilt angle of the receiver related to the z-axis direction, $V_{ij}$ is a complex value representing the signal amplitude and phase shift measured by the receiver j orientated in x-, y-, or z-directional dipole in response to the firing of the transmitter i orientated in x-, y-, or z-directional dipole. Consequently, nine different coupling components can be obtained as shown in the equations above.

As shown in Eq. (1), by applying a sinusoidal fitting function or Fourier transform, the azimuthal signals can be decoupled into three distinct signals $V_{double}(\beta)$, $V_{single}(\beta)$, and $V_{const}$, that presents a sinusoidal wave with double periods, a sinusoidal wave with a single period, and a constant signal with respect to the tool 200 azimuth angle $\beta$ per rotation, respectively, wherein $V_{double}(\beta)$ and $V_{single}(\beta)$ can generally be considered higher order mode signals. The double sinusoidal response, $V_{double}(\beta)$, can be expressed as:

$$V_{double}(\beta) = \left[\left(\frac{V_{xx} - V_{yy}}{2}\right)\cos 2\beta + \left(\frac{V_{yx} + V_{xy}}{2}\right)\sin 2\beta\right]\sin\theta_t\sin\theta_r =$$
$$A_{double}\sin\theta_t\sin\theta_r\cos(2\beta - \beta_s)$$

where $$A_{double} = \sqrt{\left(\frac{V_{xx} - V_{yy}}{2}\right)^2 + \left(\frac{V_{yx} + V_{xy}}{2}\right)^2}$$

$$\beta_s = \tan^{-1}\left(\frac{V_{yx} + V_{xy}}{V_{xx} - V_{yy}}\right)$$

Therefore, given the same formation model, the same operating frequency and the same spacing between the transmitters and receiver antenna, the amplitude $A_{double}$ is constant to any tilt angle for the transmitter and for the receiver as long as the tilt angle is not zero. This can further been seen by FIGS. 4-8, where $A_{double}$ is relatively constant for a given measurement when a depth shift or time shift is taken into account, as described herein.

Figure 3:
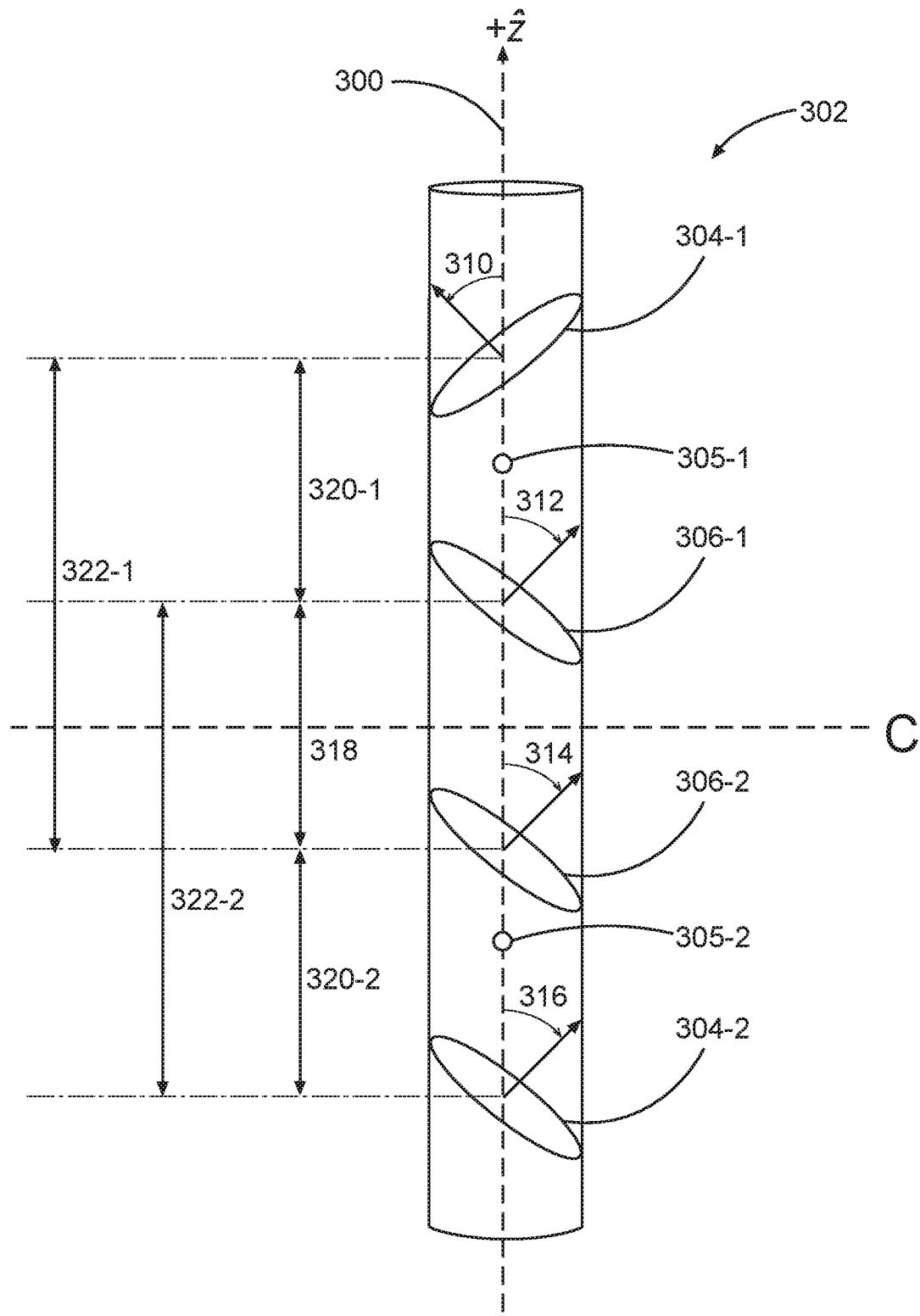
FIG. 3 illustrates a tool having an asymmetric antenna configuration, according to various embodiments.

FIG. 3 illustrates a tool 302 including an asymmetric antenna configuration, according to various embodiments. The tool 302 includes two transmitter antennas $T_{up}$ 304-1 and $T_{dn}$ 304-2. Further, the tool 302 includes two receiver antennas $R_{up}$ 306-1 and $R_{dn}$ 306-2. The transmitters 304-1, 304-2 and receivers 306-1, 306-2 are tilted relative to a longitudinal axis 300 of the tool 302. For example, angles 310, 312, 314, 316 can be any non-zero angle with respect to the longitudinal axis 300, such as 45°. The configuration in FIG. 3 is merely shown for ease of description and should not be taken as limiting. For example, as described with respect to FIG. 10, the tool can include at least two modules where each module is equipped with one transmitter and one receiver. According to the principle of reciprocity, one should expect that one antenna may be applied as a transmitter in one implementation and as a receiver at another. The configurations of transmitters-receivers antenna system disclosed herein can be interchangeable (e.g., transmitters can be used as receivers and receivers can be used as transmitters).

The first transmitter antenna 304-1 can be disposed longitudinally above (e.g., in the positive z-direction) the second transmitter antenna 304-2. The first receiver antenna 306-1 and the second receiver antenna 306-2 can be defined longitudinal distance 318 disposed from one another. Further, the receiver antennas 306-1, 306-2 can be arranged equidistant along the longitudinal axis 300 on either side of a reference location, such as center line C, which is at a midpoint between the two receiver antennas 306-1, 306-2. The first receiver antenna 306-1 can be disposed between the first transmitter antenna 304-1 and the second receiver antenna 306-2. A first longitudinal distance 322-1 from the first transmitter antenna 304-1 to the second receiver antenna 306-2 can be equal to a second longitudinal distance 322-2 from the second transmitter antenna 304-2 to the first receiver antenna 306-1. For example, the first transmitter antenna 304-1 can be disposed in the positive z-direction from the first receiver antenna 306-1 a distance 320-1. The second transmitter antenna 304-2 can be disposed in the negative z-direction from the second receiver antenna 306-2 a distance 320-2. In an example, the distances 320-1 and 320-2 are equal.

Further, the tool 302 can include a first and second reference point 305-1 and 305-2, wherein the first reference point 305-1 is associated with the first transmitter 304-1 and the first receiver 306-1 and the second reference point 305-2 is associated with the second transmitter 304-2 and the second receiver 306-2. In general, as described herein, a reference point is defined as a center point of a transmitter and a receiver set where the measurement is associated. For example, the first reference point 305-1 can be a center point between the first transmitter 304-1 and the first receiver 306-1, such as half the distance 320-1.

In an example, the tool 302 can include a processing unit (not shown) configured to control activation of the transmitter and receiver antennas and to process signals associated with the transmitters and receivers in accordance with the various methods described herein.

Figure 4:
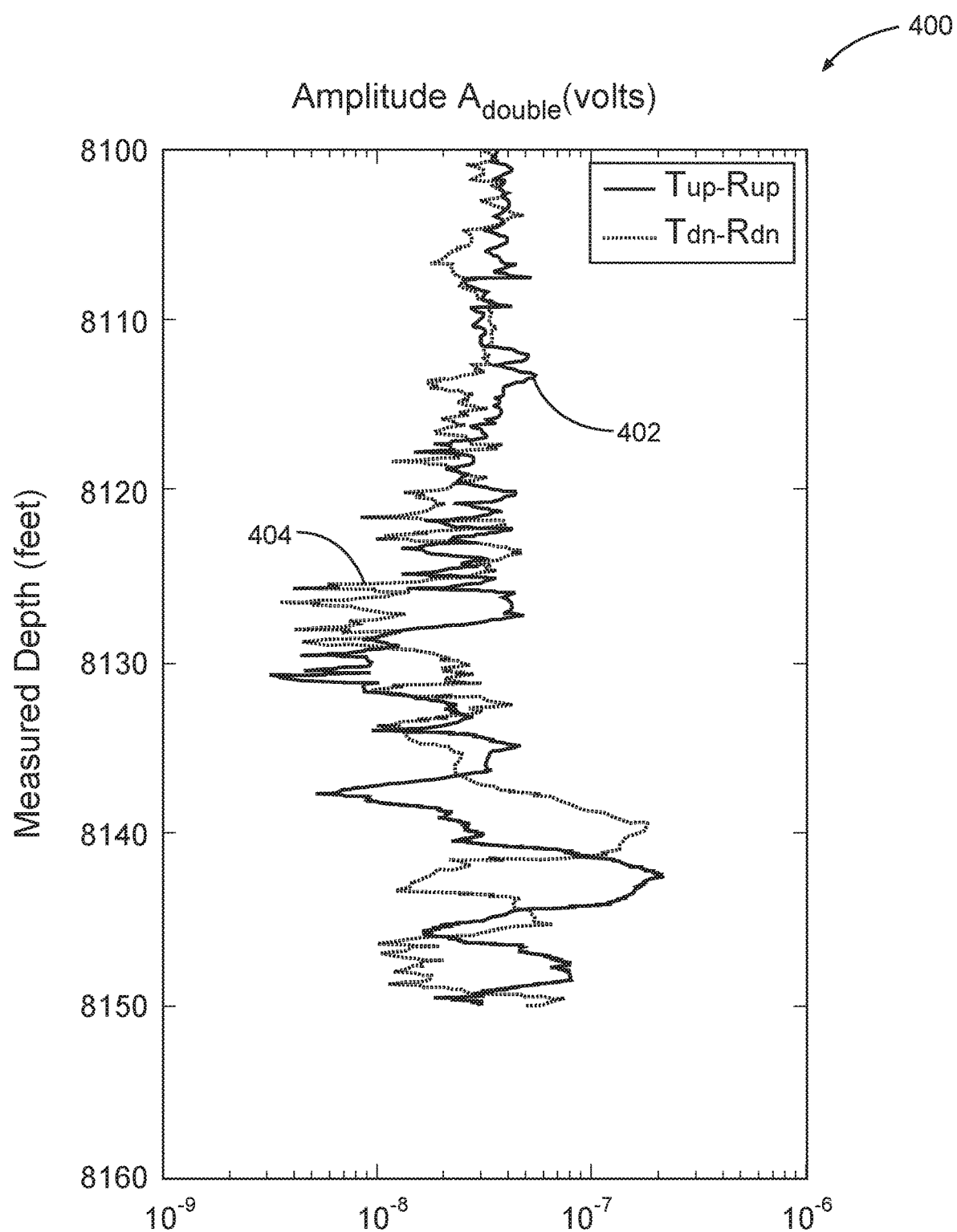
FIG. 4 illustrates a plot of exemplary amplitude field responses of the tool of FIG. 3, according to various embodiments.

FIG. 4 illustrates a plot 400 of the amplitude $A_{double}$ of field responses from the tool 302 of FIG. 3 that have been post-process manipulated to provide a given depth for each response. As described herein, depth refers to the measured depth of the borehole, as opposed to the true value depth (TVD), which is perpendicular to a horizontal plane, such as the surface. The post-process manipulated responses received at the upper receiver $R_{up}$ 306-1 in response to the upper transmitter $T_{up}$ 304-1 are shown as line 402 and the post-process manipulated responses received at the lower receiver $R_{dn}$ 306-2 in response to from the lower transmitter $T_{dn}$ 304-2 are shown 404. As described herein, post-process includes a time after a drilling operation, such as LWD or MWD described herein (e.g., not real-time). Real-time can include a time during a drilling operation, such as LWD or MWD as described herein. The depth in feet is plotted on the y-axis and the amplitude $A_{double}$ in volts is plotted on the x-axis.

FIG. 4 provides exemplary calculated $A_{double}$ values for a 28 inch distance between $T_{up}$ 304-1 and $R_{up}$ 306-1 (e.g., 320-1) and between $T_{dn}$ 304-2 and $R_{dn}$ 306-2 (e.g., 320-2), and for an 8 inch distance 318 between $R_{up}$ 306-1 and $R_{dn}$ 306-2, although embodiments are no so limited. As described herein, the distances 320-1 and 320-2 can be any known distance, such as about 8 inches to about 50 feet based on different operating frequencies and various applications. As described herein, the distance 322 must be known to accurately correlate the responses received at $R_{up}$ 306-1 from $T_{up}$ 304-1 (e.g., $T_{up}$-$R_{up}$) with those received at $R_{dn}$ 306-2 from $T_{dn}$ 304-2 (e.g., $T_{dn}$-$R_{dn}$). That is, in order to process the plurality of azimuthal measurements, using Eqs. (1) and (2), associated with both $T_{up}$-$R_{up}$ and $T_{dn}$-$R_{dn}$ the tool should meet the configuration description herein.

As can be seen in FIG. 4, depth delay from the responses of the lower transmitter $T_{dn}$ 304-2 received at Rd 306-2, line 404, is evident by the "lag" in the $R_{up}$ 306-1 responses relative to $T_{up}$ 304-1, line 402. That is, when a signal associated with the second reference point 305-2 is received at $R_{dn}$ 306-2 from the $T_{dn}$ 304-2 transmitter and a signal associated with the first reference point 305-1 is received at $R_{up}$ 306-1 from the $T_{up}$ 304-1 transmitter, the depth of the second reference point 305-2 will be larger than the depth of the first reference point 305-1 due to the location of each transmitter on the tool. The reference point of a measurement, as described herein, can be used for interpreting downhole depth of a particular tool measurement based on depth device at drill bit. As such, continuing with the example of the distances 320-1 and 320-2 being 28 inches and the distance 318 being 8 inches, the "lag" visualized in FIG. 4 therefore correlates to a distance of 36 inches due to physical antenna locations on the tool. That is, the depth delay or lag corresponds to the distance between the first and second reference points 305-1, 305-2.

Figure 5:
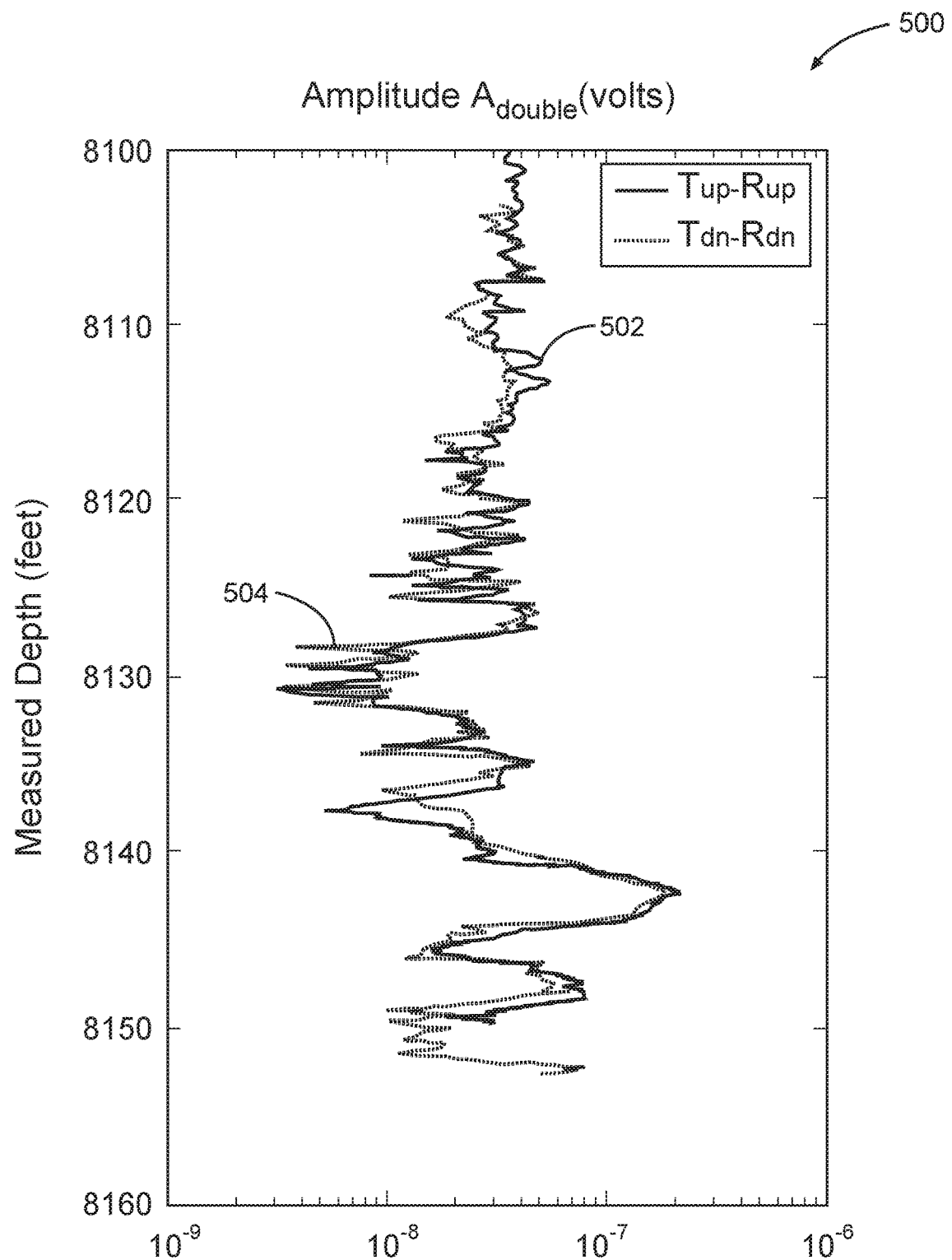
FIG. 5 illustrates a plot of the amplitude field responses of FIG. 5 after a depth shift mechanism has been applied, according to various embodiments.

FIG. 5 illustrates a plot 500 indicating the amplitude $A_{double}$ plot of FIG. 4 after a post-process depth-shifting procedure. For example, the depth delay, as described in connection with FIG. 4, can be applied to the $T_{dn}$-$R_{dn}$ measurement such that the responses of $T_{up}$-$R_{up}$ 502 and $T_{dn}$-$R_{dn}$ 504 more closely correspond. For example, the determined depth delay of 36 inches can be removed from the depth measurements associated with responses of $T_{dn}$-$R_{dn}$. That is, the plot 500 illustrates the responses from $T_{up}$-$R_{up}$ 502 corresponding to the responses of $T_{dn}$-$R_{dn}$ 504 after a post-process depth-shift mechanism has been applied. The depth-shift mechanism includes taking into account the physical distance between the first and second reference points 305-1, 305-2 of each measured signal to determine required depth delay for $T_{dn}$-$R_{dn}$ measurements, such as for example 36 inches as shown in FIG. 3. The substantially matching results in FIG. 5 demonstrate a mimic operation of symmetrical tool antenna structure based on asymmetrical tool structure in FIG. 3.

It is important to note that this depth shift measurement is done post-process (e.g., not real time), as opposed to the time-shift mechanism discussed herein. FIGS. 4 and 5 are provided to show that for the asymmetrical design shown in FIG. 3 the $A_{double}$ responses for the transmitters $T_{up}$ and $T_{dn}$ are in-fact substantially equal at the same depth and frequency. Consequently, this amplitude correlation can be utilized in real-time. Depth shift in real time may require accurate depth measurements for every tool at every location. Generally speaking, depth at a drill bit is known in LWD real-time application, and real-time depth for tools in other BHA sections can be interpreted based on the drill bit depth. However, due to a dog-leg or other LWD drilling conditions (e.g., temperature, pressure, etc.), interpreted real-time depth may not be accurate enough, such that applying the depth delay based on real-time depth measurements may not suffice. More accurate depth delay or time-delay calculations on tool measurements permit corresponding inversion products (e.g., formation anisotropy, relative dip, or other formation properties) to be more accurate, as described herein.

Figure 6:
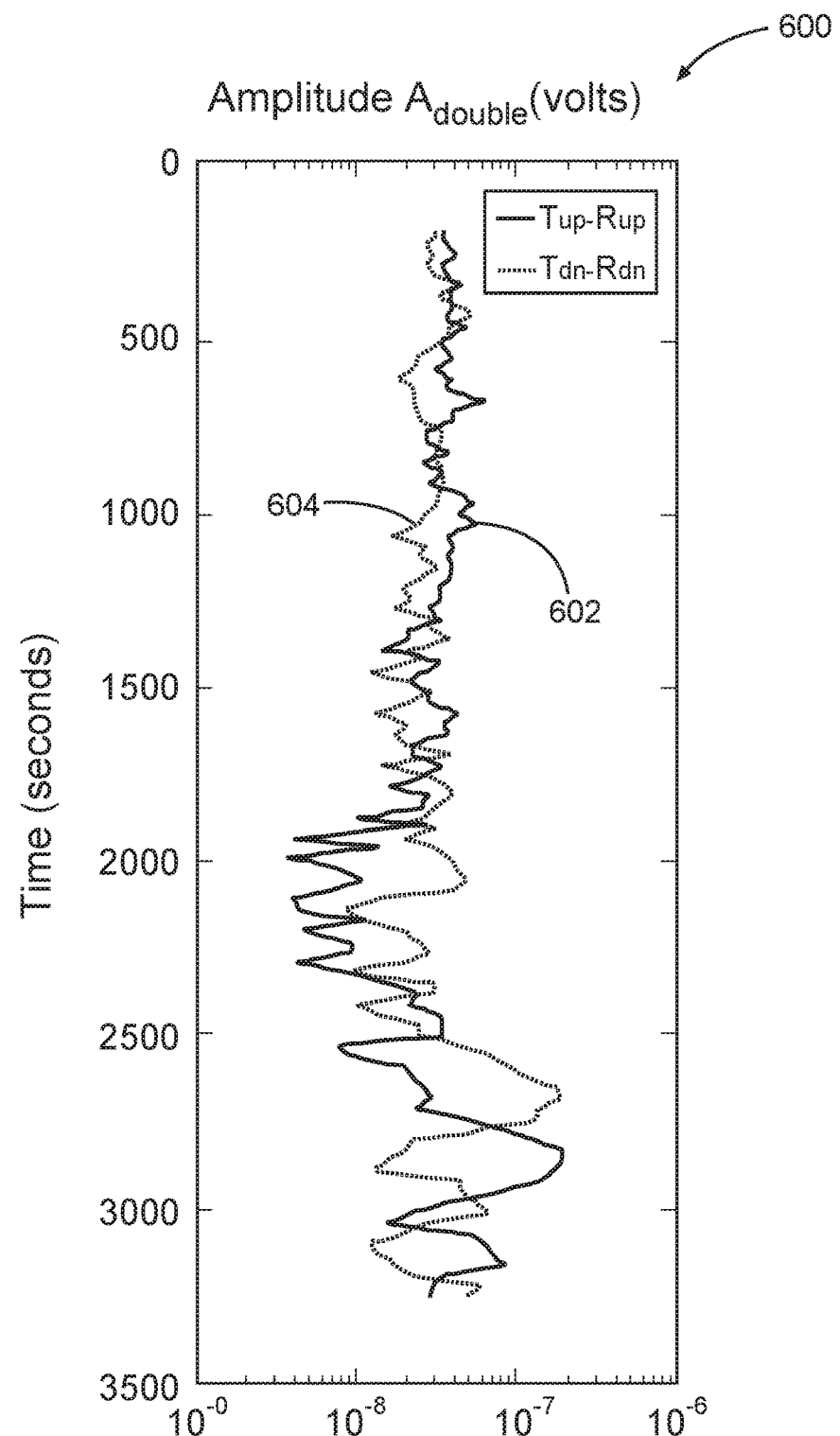
FIG. 6 illustrates a plot of the exemplary amplitude responses of FIG. 4 in the time-domain, according to various embodiments.

FIG. 6 illustrates a plot 600 of a first and second plurality of higher order mode signals, such as the real-time amplitude $A_{double}$ of the field responses (e.g., electromagnetic measurements) measured at the receiver $R_{up}$ 306-1 from the transmitters $T_{up}$ 304-1 ($T_{up}$-$R_{up}$) and measured at $R_{dn}$ 306-2 from the transmitter $T_{dn}$ ($T_{dn}$-$R_{dn}$) 304-2 of FIG. 3, in the time-domain. That is, the calculated $A_{double}$ of the azimuthal measurements of $T_{up}$-$R_{up}$, shown as line 602, and $T_{dn}$-$R_{dn}$, shown as line 604, are plotted on the x-axis and the time at which each of the responses is received is plotted on the y-axis. FIG. 6 can be created by calculating $A_{double}$ using Eq. (2) for the plurality of received field responses, such as azimuthal measurements.

A recording start time can be established, such as 0 seconds, to produce the plot FIG. 6. The recording start time can be include any time from the beginning of a drilling operation to the end of the drilling operation, such that an end time of recording can provide sufficient data to perform the time-shift mechanism described herein. Sufficient data can include enough data in time-domain that correlates to at least a distance from the first reference point 305-1 to the second reference point 305-2 or the distance from the drill bit depth measuring device to either the first or second reference points 305-1 and 305-2, as described herein. In an example, at the recording start time, the drill bit depth measurement device records a depth while the at least one antenna set measures formation properties.

Figure 10:
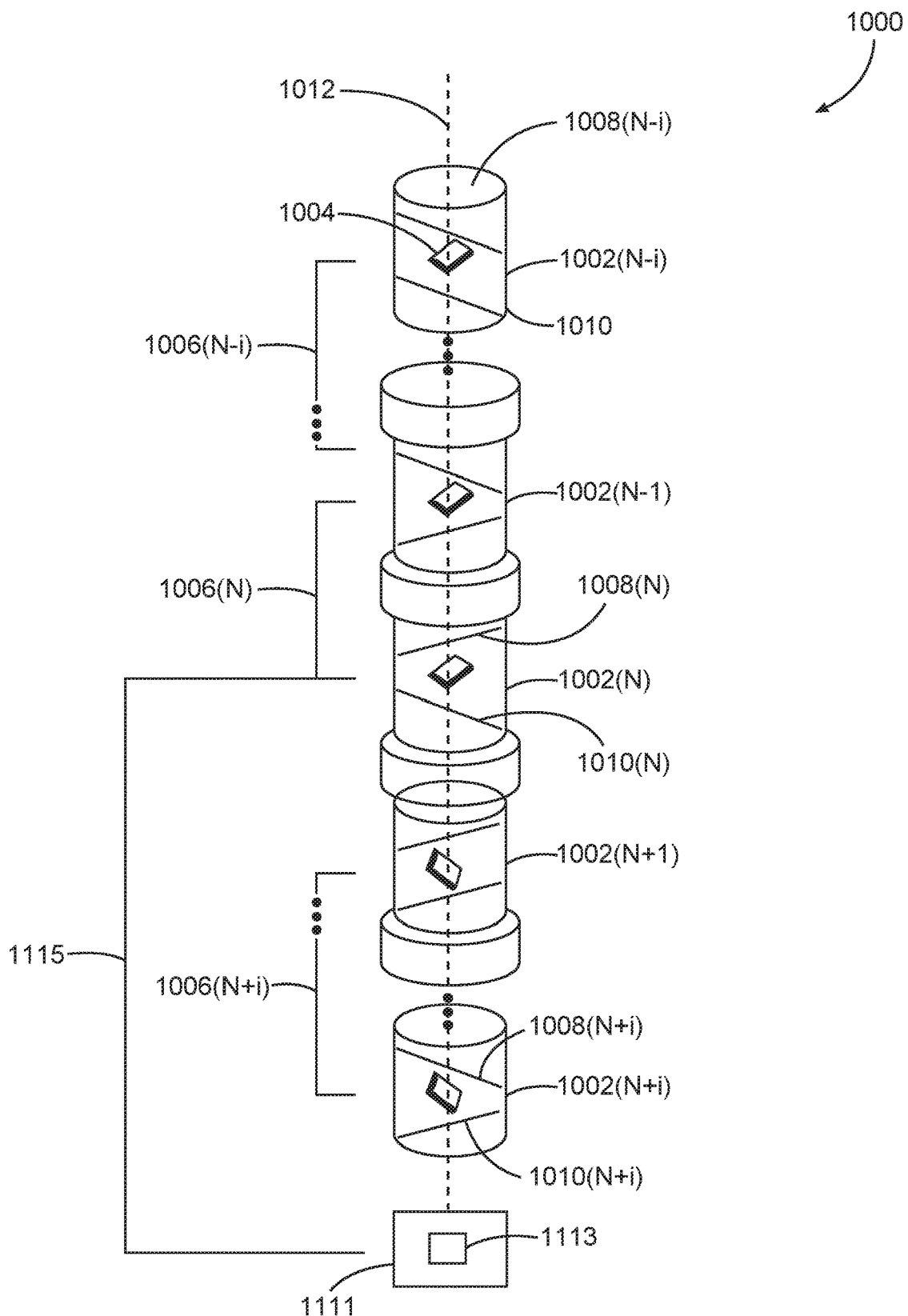
FIG. 10 illustrates a module example of a tool having a tilted antenna design configuration, according to various embodiments.

In an example, real-time formation measurements for one set of measurements, such as $T_{dn}$-$R_{dn}$ 604 of FIG. 6, can be obtained or recorded, and correlated to a depth measurement device at a drill bit, as described in reference to FIG. 10. For example, a distance from the depth measurement device at the drill bit to the second reference point 305-2 can be known, such that subtracting that distance from the measured depth at the drill bit provides the depth of the second reference point 305-2 downhole. In an example, the distance from the selected reference point to the drill bit depth measurement device is minimized, so as to reduce potential error from a non-linear borehole. Another set of measurements, such as $T_{up}$-$R_{up}$ as line 602, can be correlated with measurements 604 so that more accurate depth measurements for the set of measurements 602 can be calculated by applying alignment methods to FIG. 6.

For example, as shown in FIG. 6, at around 2600 seconds there is a peak amplitude $A_{double}$ for the $T_{dn}$-$R_{dn}$ measurements 604. One can determine, such as by the method as described herein in reference to at least FIG. 8, that at time of around 2782 seconds the $T_{up}$-$R_{up}$ measurements 602 record a similar peak amplitude $A_{double}$ as the $T_{dn}$-$R_{dn}$ measurements 604. As described herein, the $T_{dn}$-$R_{dn}$ antenna set and $T_{up}$-$R_{up}$ antenna set have the same amplitude $A_{double}$ for a given depth and operating frequency. Therefore, it can be determined that when the $T_{up}$-$R_{up}$ measurements 602 record the same peak amplitude $A_{double}$ at 2782 seconds, the first reference point 305-1 is at the same location downhole as when the second reference point 305-2 recorded a peak amplitude $A_{double}$ at 2600 seconds. That is, the time delay in real-time between the second reference point 305-2 and the first reference point 305-1 is 182 seconds. Consequently, time-domain shifting either the $T_{up}$-$R_{up}$ measurements 602 up (e.g., back in time) 182 seconds or shifting the $T_{dn}$-$R_{dn}$ measurements 604 down (e.g., ahead in time) 182 will align the amplitude $A_{double}$ measurements in the time-domain in real-time. As described herein, it can be advantageous to shift the measurements associated reference point(s) further away from the drill bit measurement device (e.g., 305-1) to correlate with the measurements associated with the reference point closest to the drill bit measurement device (e.g., 305-2), so as to reduce error when determining a depth downhole in real-time.

Figure 7:
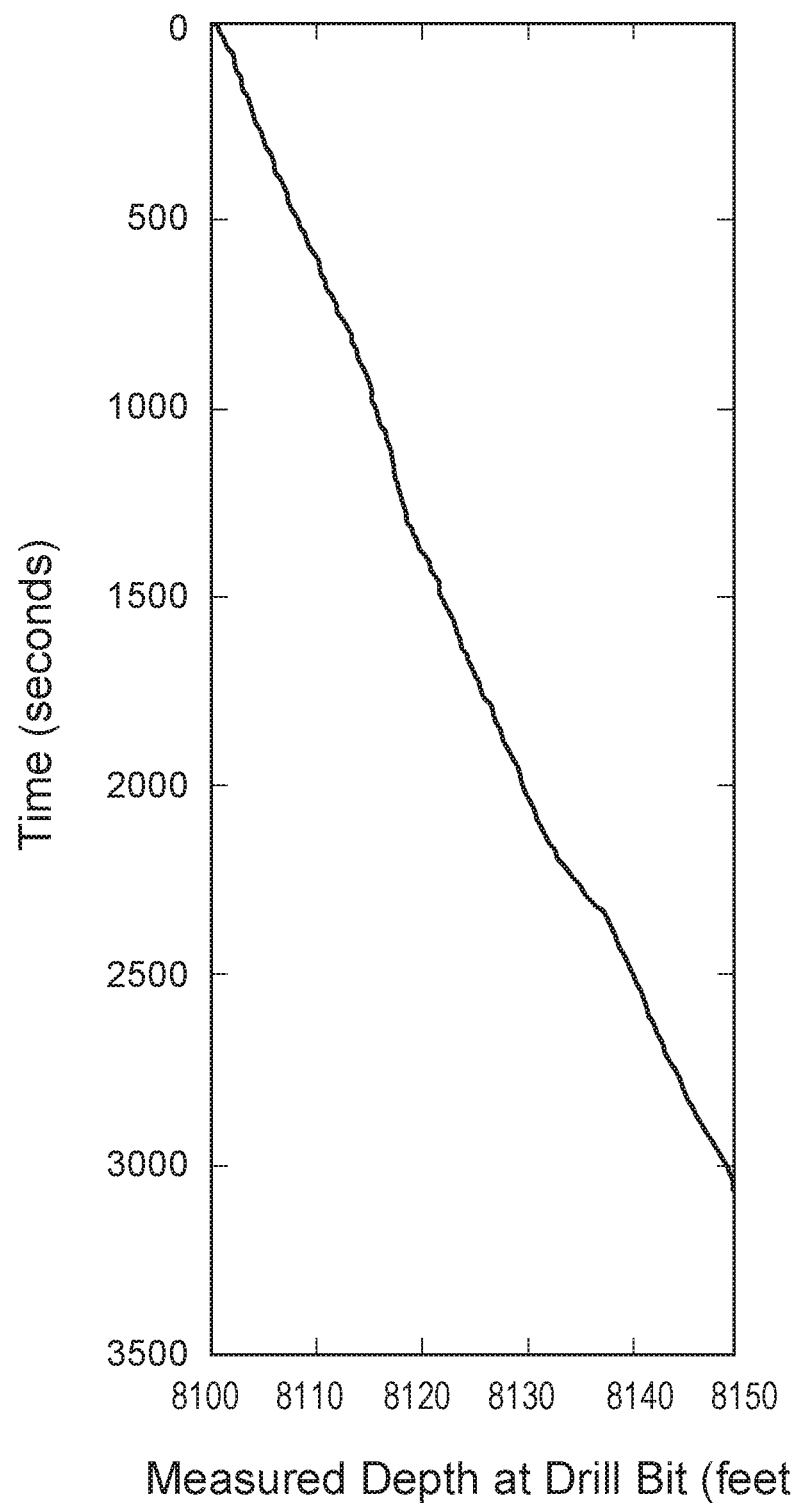
FIG. 7 illustrates a drill bit depth plot in the time domain, according to various embodiments.

Further, as shown in FIG. 7, the real-time depth taken at the drill bit depth measurement device at 2600 seconds is 8140 feet. The drill bit depth can be correlated to the depth of the second reference point 305-2 at 2600 seconds by subtracting the known distance between the measurement device and the second reference point 305-2. As an example, assuming the second reference point is 24 inches from the drill bit depth measurement device, although embodiments are not so limited, the depth of the second reference point 305-2 at 2600 seconds is 8138 feet, and as such, the amplitude $A_{double}$ at 8138 feet is equal to the peak amplitude $A_{double}$. Further, the distance from the first reference point 305-1 to the second reference point 305-2 is known to be 36 inches, as discussed herein. Therefore, since the peak amplitude $A_{double}$ values aligns with a time shift of 182 seconds and the $A_{double}$ values are equal at the same depth, it is known that the first reference point 305-1 traveled 36 inches in the time frame of 182 seconds. This can further provide an approximate velocity of the tool or drill bit of about 36 inches/182 seconds or 0.1978 inches/second.

Additionally, the real-time time-depth shift aligning the peak amplitude $A_{double}$ measurements of the antenna sets 602 and 604 can provide the depth of the remaining reference point 305-1. The calculated depth for the $T_{up}$-$R_{up}$ measurement reference point 305-1 at 2782 seconds is equal to the depth of the second reference point minus the known distance between the two reference points or 8135 feet (e.g., 8138 ft.-36 inches). That is, for this example the time delay for $T_{up}$-$R_{up}$ measurement 602 is 182 seconds, indicating a physical depth delay of 36 inches (e.g., 322-1 in FIG. 3). Referencing the plot of FIG. 7 the drill bit depth device indicates 35.68 inches in real-time depth measurements over a 182 second time frame. This difference can be reduced by installing the tilted antenna set $T_{dn}$-$R_{dn}$ at drill bit or closer to the drill bit so that all calculated depth measurements for other antenna sets, such as $T_{up}$-$R_{up}$ signals, can be referenced to real-time bit depth. In another example, the depth measurement device can be installed at a reference point, such that all other antenna sets can acquire calculated real-time depths by using proposed alignment methods in time-domain signals and reference the depth measurement device at the reference point. It should be noted, that due to stick slip or the like, the provided real-time depth measurements in FIG. 7 can register the same depth (in x axis of FIG. 7) over a given time frame (in y axis of FIG. 7).

Figures 8A, 8B:
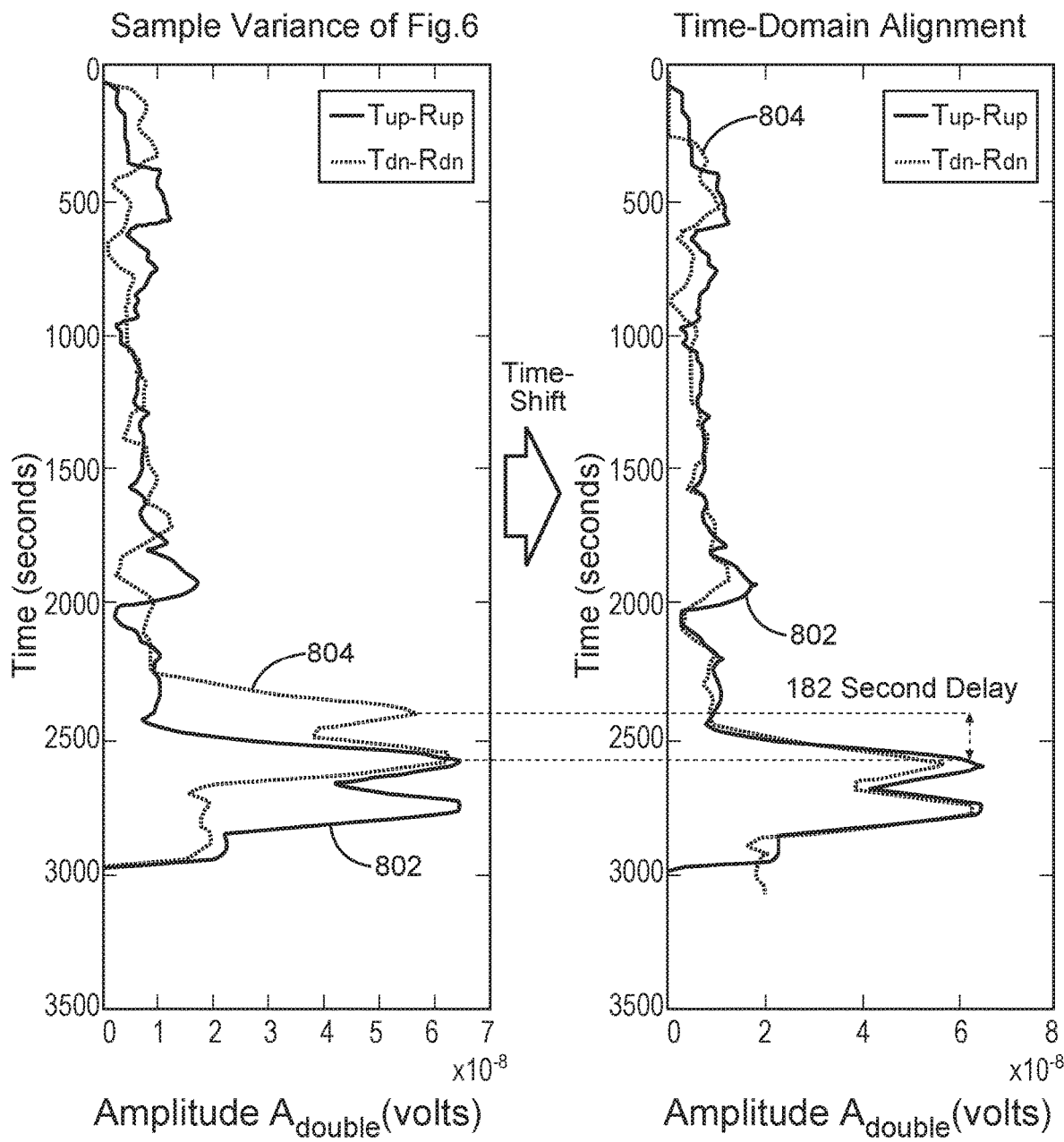
FIGS. 8A-8B illustrate a plot of the amplitude time-domain field responses of FIG. 6 after a time-domain shift mechanism has been applied, according to various embodiments.

FIGS. 8A and 8B illustrate one method of time-shifting, in real-time, downhole measurements. For example, sample variance $S_N$ of each signal can be used to align the $T_{up}$-$R_{up}$ and $T_{dn}$-$R_{dn}$ field response, where:

$$S_N = \frac{1}{N}\sqrt{\sum_{i=1}^{N}(x_i - \bar{x})^2} \quad (3)$$

where, $x_i$ is the signal at point I, N is the number of selected points and $\bar{x}$ is the sample mean within the selected points. As discussed in connection with Eq. (1), the amplitude $A_{double}$, in theory, remains the same relative to the same spacing and same operating frequency measurement at the same downhole location. However, in practice the amplitude $A_{double}$ can vary due to temperature effects, drilling conditions, or system noises. By using sample variance $S_N$ to align the field responses of $T_{up}$-$R_{up}$ and $T_{dn}$-$R_{dn}$ the effect of these variances can be reduced. FIG. 8A illustrates a plot of the sample variances $S_N$ of each field measurement for both $T_{up}$-$R_{up}$ 802 and $T_{dn}$-$R_{dn}$ 804 for the measurements in FIG. 6. The selected points N can be defined as a time window corresponding to a peak, such as, for example, the peak around 2600 seconds shown in FIG. 6. Further, a slope of each individual signal can be calculated and used to correlate the responses from $T_{up}$-$R_{up}$ and $T_{dn}$-$R_{dn}$. Other pattern recognition techniques understood in the art can be employed to correlation the signals of $T_{up}$-$R_{up}$ and $T_{dn}$-$R_{dn}$. In an example, the selected points N can be defined by a user preference. That is, the $T_{up}$-$R_{up}$ 602 and $T_{dn}$-$R_{dn}$ 604 can be correlated (e.g., time shift) according to similarity or a common parameter, as described herein.

A single time-domain shift can be calculated over the selected time window. As such, the more time data collected (e.g., a larger time window) the more similarities can be determined and a better alignment between $T_{up}$-$R_{up}$ and $T_{dn}$-$R_{dn}$ signals can be achieved. However, the less time data collected (e.g., a smaller time window) can improve accuracy of LWD depth measurements while drilling. In theory, the calculated depth shift based on time-domain should be the same as the actual distance (e.g., 322-1, 322-2). However, temperature or pressure within the well (e.g., 102, FIG. 1) can affect the distance 322-1 or 322-2, such as increasing or decreasing the distance. The time-domain shift mechanism herein can determine that difference, if any. As seen in FIG. 8A, and discussed herein, there is a time delay of 182 between the measurements 802 and 804. FIG. 8B shifts the measurements associated with $T_{dn}$-$R_{dn}$ 804 antenna set down (e.g., ahead in time) 182 seconds, in order to align with the measurements associated with $T_{up}$-$R_{up}$ 802 antenna set. In an example, the measurements 802 can shift upward (e.g., back in time) or the two measurement plots 802 and 804 could both shift so as to combine for a total shift of 182 seconds.

In an example, due to the tilted antenna configuration and the related Eq. (1), amplitude of $A_{double}$ in real-time can be utilized to correlate $T_{up}$-$R_{up}$ measurement and $T_{dn}$-$R_{dn}$ measurement without knowing corresponding depth records of the upper antenna set and lower antenna set. For example, at least one of $T_{up}$-$R_{up}$ or $T_{dn}$-$R_{dn}$ antenna sets can be a known distance from the drill bit, including a depth measurement device of the drill bit. Further, the distance between $T_{up}$-$R_{up}$ and $T_{dn}$-$R_{dn}$ can be known. The time-shift determined to produce FIG. 8B can be correlated with the known distance between the drill bit and the at least one tilted antenna set, as described herein.

Figures 9A, 9B:
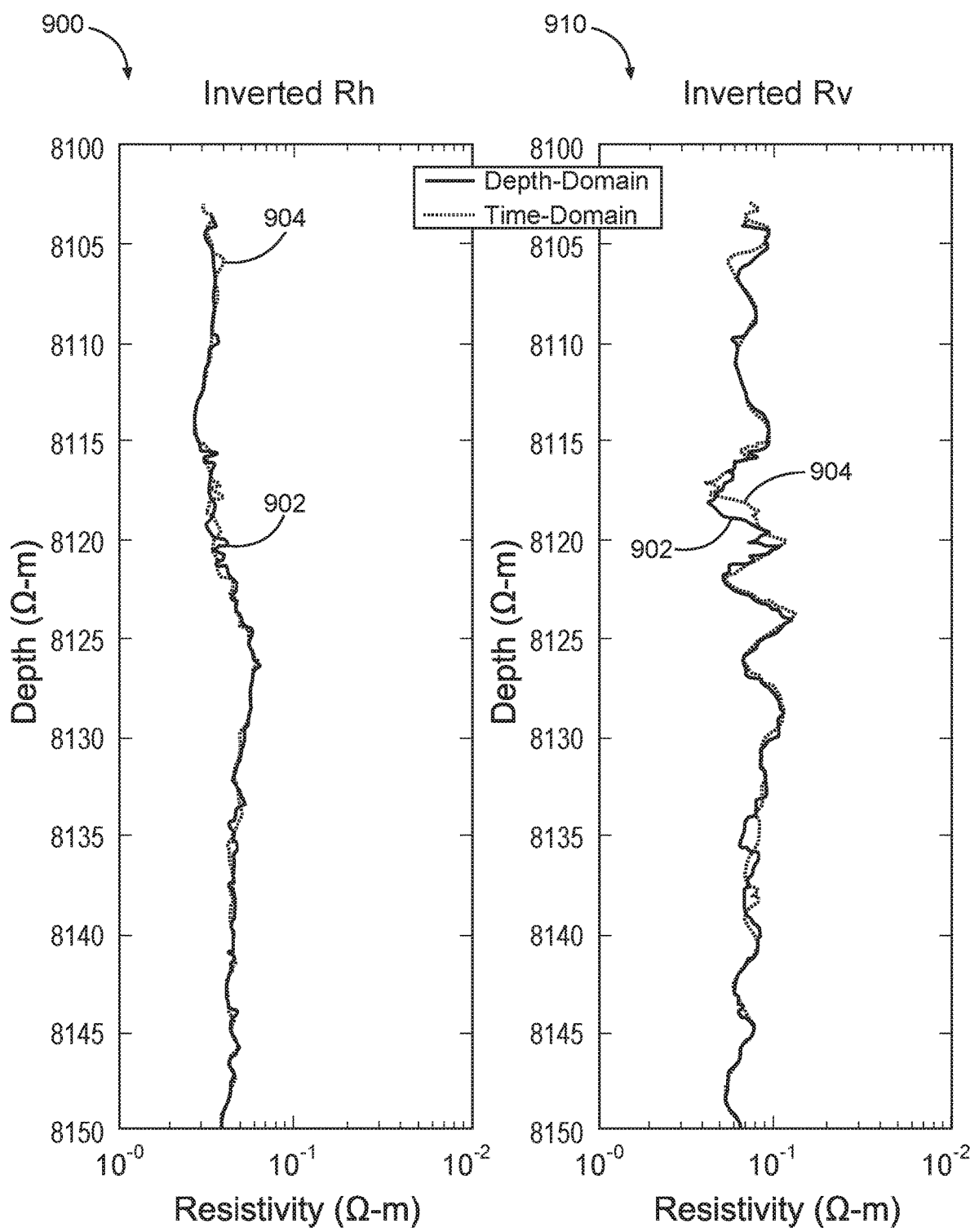
FIGS. 9A-9B illustrate inversion comparison plots of FIG. 5 and FIG. 7, according to various embodiments.

FIGS. 9A and 9B illustrate that formation properties determined with the time-shift mechanism, described herein in connection with FIGS. 6-8B, correlates with different techniques, such as a depth shift mechanism. For example, determination on formation properties (e.g., Rh and Rv) can be achieved based on asymmetrical antenna structure and depth delay compensation. Other shift mechanisms, such as a depth shift denoted by solid line 902 in FIGS. 9A and 9B, are available in post-processing due to the requirement of high depth accuracy in real-time application. The proposed time-domain shift mechanism described herein can provide formation properties post-process or real-time, as shown by dashed line 904 in FIGS. 9A and 9B.

FIG. 10 illustrates a module configuration 10X) embodiment including a plurality of tilted antenna configuration modules 1002-(N−i), . . . 1002-N . . . 1002-(N+i), wherein N represents any number of modules 1002 and (i) represents position relative to module N, such as −i, −3, −4, −2, −1, +1, +2, +3, +4, such that a positive (i) position represents a location further downhole toward a drill bit 1111. In such an example, each module can include a single transmitter and a single receiver, wherein each module is operated at a substantially similar frequency to produce a corresponding measurement and wherein the separation between the transmitter and the receiver of each module is the same. Such a configuration, can have the time-shifting mechanism, described herein, applied to the multiple measurements (e.g., at least two) from the available multiple modules. Although multiple modules 1002-(N−i), . . . 1002-N . . . 1002-(N+i) are shown, it is contemplated that the tool (e.g., 302, FIG. 3) can include a single module. In such an example, the single module includes at least two transmitters and at least one receiver operated at substantially the same operating frequency such that two measurements can be provided at the receiver (e.g., from each transmitter). Substantially similar frequencies include frequencies with about 5%, about 2%, about 1%, or about 0.5% or less than one another. As shown, each module 1002 can include at least one transmitter antenna 1008 and at least one receiver antenna 1010, each transmitter antenna 1008 and receiver antenna 1010 tilted relative to the longitudinal axis 1012. The transmitter antennas 1008 and receiver antennas 1010 can be configured as described herein. That is, the position of the transmitter 1008 or receiver 1010 can be flipped or switched in each module 1002-(N−i), . . . 1002-N . . . 1002-(N+i).

As shown, a distance 1115 can be known between a depth measurement device 1113 of the drill bit 1111 and a known location, such as a center 1004, of the module 1002-N, where the center point 1004 can include a processor as described herein.

As described herein in connection with FIGS. 6 and 7, at the recording start time (e.g., time 0) the depth of the depth measurement device 1113 can be taken. Further, at the recording start time the transmitters of the modules 1008-(N−i) . . . 1008-N . . . 1008-(N+i) can begin discreetly or continuously recording voltage or amplitude $A_{double}$. After the desired number of amplitude measurements have been obtained a time shift between the transmitter 1008-N and other transmitters 1008-(N−i) . . . 1008-(N+i) can be determined as described herein. For example, a transmitter 1008-(N−i) can be considered $T_{up}$ at a known distance 1006-(N−i) from transmitter 1008-N, or $T_{dn}$. Because the distance between 1008-N and 1113 is known, 1115, the depth at the initial recording time of $T_{dn}$ can also be known by a simple addition. Applying the known distance 1006-(N–i) between the transmitters 1008-(N–i) and 1008-N, along with the calculated time-shift, the depth of each transmitter can be determined in real time.

Figure 11:
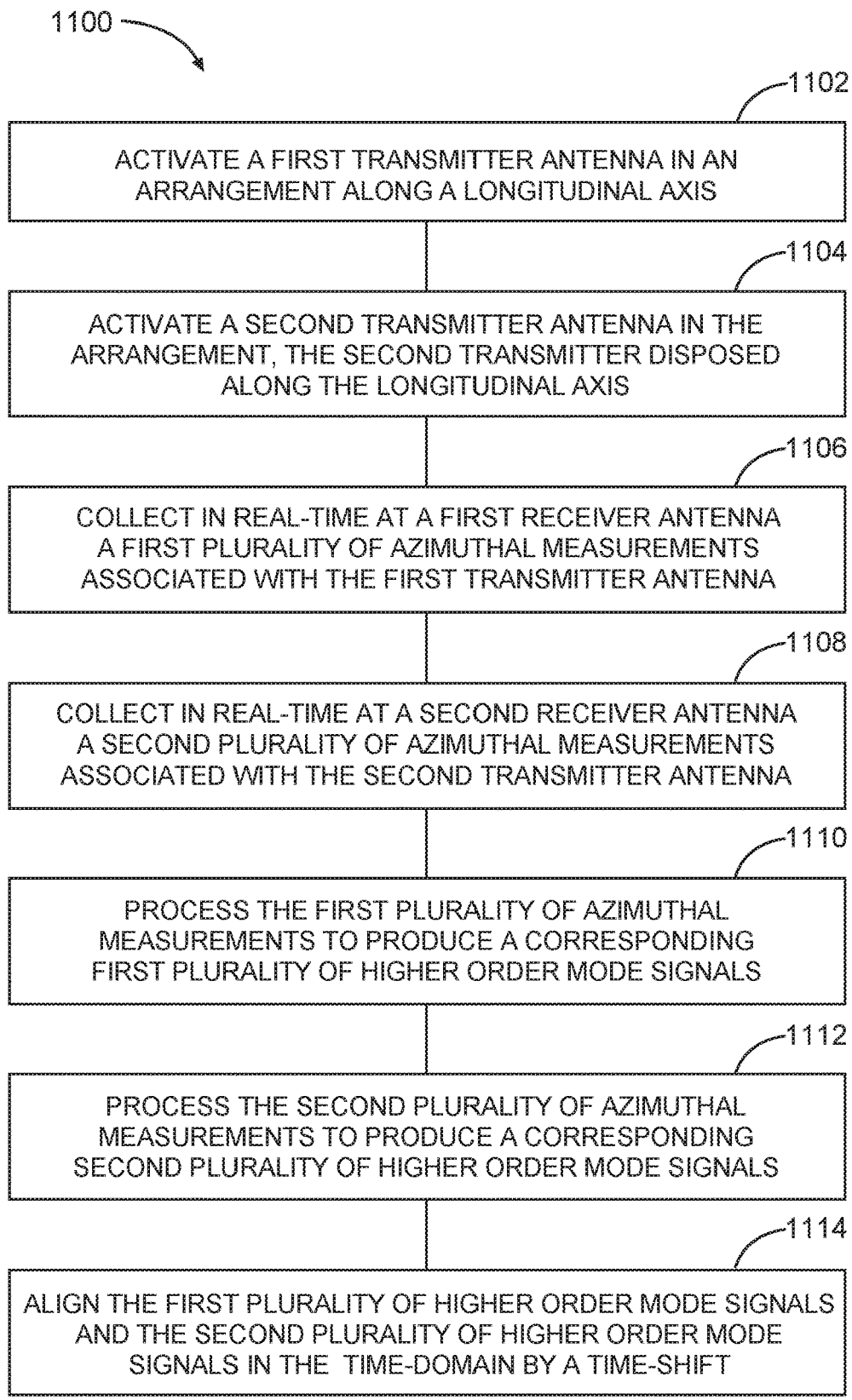
FIG. 11 illustrates a method of measuring aligning a plurality of downhole electromagnetic measurements, according to various embodiments.

FIG. 11 illustrates a block diagram of method 1100 for aligning a plurality of downhole electromagnetic measurements, such as in real-time or post drilling process. At 1102, a first transmitter antenna along a longitudinal axis of an arrangement can be activated at an initial time. The first transmitter antenna can be configured to operate at an operating frequency, as described herein. At 1104, a second transmitter antenna, along the longitudinal axis of the arrangement, and disposed from the first transmitter antenna, can be activated at the initial time. In an example, the second transmitter antenna can be configured to operate at substantially the same operating frequency. The first and second transmitter antennas can be tilted with respect to the longitudinal axis, as described herein.

At 1106, a first plurality of azimuthal measurements can be collected in real-time, such as at a first receiver along the longitudinal axis. The first receiver antenna can be tilted with respect to the longitudinal axis. The first receiver and the first transmitter antenna can be a known distance apart, such that a first reference point is located equidistant between the first receiver antenna and first transmitter antenna. The first plurality of azimuthal measurements can be associated with the first transmitter antenna, such as the first reference point.

At 1108, a second plurality of azimuthal measurements can be collected in real-time, such as at a second receiver along the longitudinal axis. The second receiver antenna can be tilted with respect to the longitudinal axis. The second receiver and the second transmitter antenna can be a known distance apart, such that a second reference point is located equidistant between the second receiver antenna and second transmitter antenna. The second plurality of azimuthal measurements can be associated with the second transmitter antenna, such as the second reference point. The first plurality of azimuthal measurements and the second plurality of signals can be offset from each other in the time-domain, such as described herein. In an example, the distance between the first transmitter antenna and the first receiver antenna can be substantially equal to the distance between the second transmitter antenna and the second receiver antenna. Substantial equal distances include distances within about 5%, about 2%, about 1%, or about 0.5% or less of each other. Further, in an example, the first and second receiver antennas can be a known distance apart, such that the first and second reference points are a known distance apart.

Further, once the first and second transmitter/receiver antennas are activated they can run continuously or discreetly, such as at a given interval. The arrangement of transmitters and receivers can be included on a tool, such as tool 302 of FIG. 3 and described herein.

The first and second plurality of azimuthal measurements can be collected over a predetermined time interval beginning from the initial recording time. For example, from the beginning of a drilling operation to the end of a drilling operation or any time interval therein. In an example, collecting the plurality of azimuthal measurements can include collecting within time-domain, such that each measurement of the plurality of azimuthal measurements is associated with a time, the first transmitter/receiver antennas or the second transmitter/receiver antenna, and amplitude. That is, the each collected measurement can be associated with the respective transmitter antenna and the respective receiver antenna.

At 1110, the first plurality of azimuthal measurements can be processed to produce a corresponding first plurality of higher order mode signals, such as $A_{double}$ signals. At 1112, the second plurality of azimuthal measurements can be processed to produce a corresponding second plurality of higher order mode signals, such as $A_{double}$ signals.

At 1114, the first plurality of signals and the second plurality of signals can be aligned in the time-domain by a time shift. In various methods associated with the method 1100, aligning 1114 can include identifying a similarity between the first plurality of signals and the second plurality of signals and time-shifting the first or second plurality signals such that the identified similarity of the first and the second plurality of signals corresponds to the time-domain of either the first plurality of signals or the second plurality of signals. A similarity can include at least one of a peak, a slope, a sample variance, a derivate, and other pattern classification algorithms configured to recognize similarity, patterns or the like.

In various methods associated with the method 1100, the method can include determining a common parameter, including at least one of a slope, a peak, and a sample variance, of at least a portion of the first plurality of signals and at least a portion of the second plurality of signals and, correlating the portion of the first plurality of signals and the portion of the second plurality of signals in the time-domain based on the common parameter. In an example, the sample variances can be correlated such that the responses of the first transmitter antenna or the second transmitter antenna can be time shifted. By using the sample variance method, the benefit of at least reducing system variances, such as temperature effects, drilling conditions, or system noises.

In various methods associated with the method 1100, the calculated time-domain shift, as described herein, can be used in connection with a depth measurement to determine in real-time the depth of the tool, including the transmitters and receivers. In an example, the method 1100 can include obtaining, at a drill bit, a drill bit depth measurement at the initial recording time. The drill bit depth measurement can be taken discretely or continuously over the time interval. The drill bit can be a known distance from at least one of the first and second reference points. Further, the depth of the drill bit, such as from the drill bit depth measurements, can be correlated with the depth of at least one of the first and second reference points, as described herein.

In an example, the time-shift can be correlated to the known distance between the first and second reference points, so as to determine a velocity of the tool, as described herein.

In an example the method can include: 1) obtaining a drill bit depth of a drill bit at an initial recording time; 2) collecting, in real-time, a first plurality of electromagnetic measurements at an operating frequency from a first tilted transmitter antenna and a first tilted receiver antenna, separated from each other by a first longitudinal distance and disposed equidistant about a first reference point, the first reference point a known second longitudinal distance from the drill bit; 3) collecting, in real-time, a second plurality of electromagnetic measurements, at substantially the same operating frequency, from a second tilted transmitter antenna and a second tilted receiver antenna, separated by substantially the same first longitudinal distance and disposed equidistant from a second reference point, different than the first reference point: 4) collecting, in real-time, a third plurality of electromagnetic measurements, at substantially the same operating frequency, from a third tilted transmitter antenna and a third tilted receiver antenna, separated by substantially the same first longitudinal distance and disposed equidistant about a third reference point, different than the first and second reference points; 5) processing the first, second, and third plurality of electromagnetic measurements to produce a corresponding first, second, and third plurality of $A_{double}$ signals, respectively; 6) determining a depth of the first reference point, based on the drill bit depth at the initial recording time and the known second distance; 7) aligning the first plurality of $A_{double}$ signals with the second plurality of $A_{double}$ signals in the time-domain by a first time-shift; and 8) aligning the first plurality of $A_{double}$ signals with the third plurality of $A_{double}$ signals in the time-domain by a second time-shift. The exemplary method described herein is numbered for ease of organization and should not be taken as limiting and order in which the method can be performed.

The method 1100, as well as the various methods described in association with the method 100, can include a logging-while-drilling method.

Figure 12:
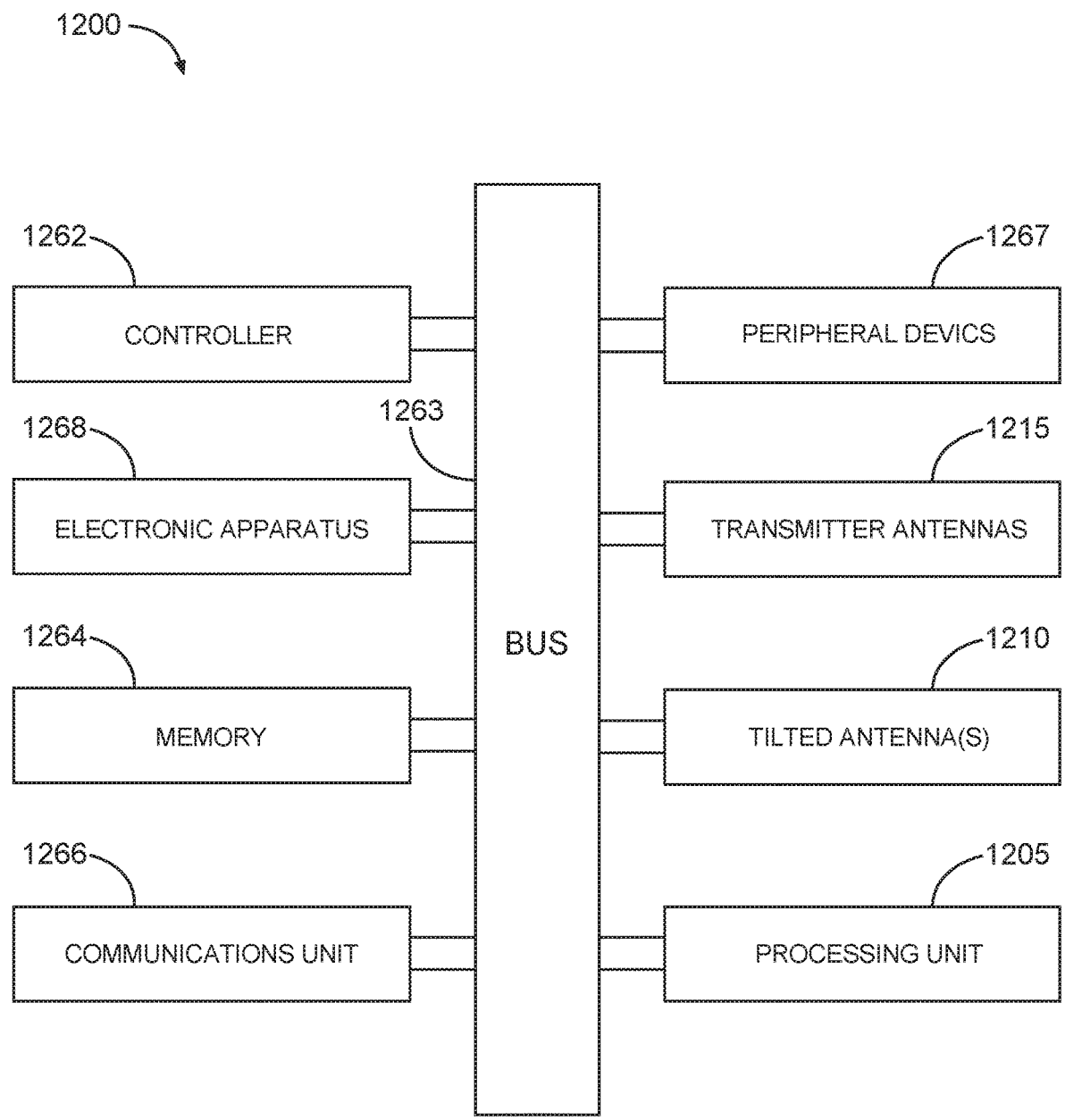
FIG. 12 illustrates a block diagram of an example system having a processing unit and a tool to align measurements, according to various embodiments.

FIG. 12 depicts a block diagram of features of an example system 1200 having a processing unit and a tool to operatively provide measurements to align real-time signals. System 1210 includes a sensor tool 1205 having an arrangement of transmitters 1215 and receivers 1210 in which measurement signals can be acquired in the arrangement of transmitters and receivers in response to activating one or more transmitters in the arrangement, where processing the collected signals from the receivers and transmitter provides measurements such that the tool can determine a depth measurement without the use of a dedicated depth measurement device. An implementation of sensor tool 1205 can provide an asymmetric antenna LWD tool, which may not be physically implementable directly as a LWD tool. The arrangements of transmitters and receivers of sensor tool 1205 can be realized in similar or identical manner to arrangements discussed herein.

System 1200 can also include a controller 1262, a memory 1264, an electronic apparatus 1268, and a communications unit 1266. Controller 1262, memory 1264, and communications unit 1266 can be arranged to control operation of sensor tool 1205 in a manner similar or identical to a processing unit discussed herein. Various components of system 1200 can operate together as a processing unit to provide control and processing for sensor tool 1205 to correlate a first tilted antenna position with a second antenna position in time-domain. Controller 1262, memory 1264, and electronic apparatus 1268 can be realized to activate transmitter antennas and receiver antennas in accordance with measurement procedures and signal processing as described herein. Communications unit 1266 can include downhole communications in a drilling operation. Such downhole communications can include a telemetry system.

System 1200 can also include a bus 1263, where bus 1263 provides electrical conductivity among the components of system 1200. Bus 1263 can include an address bus, a data bus, and a control bus, each independently configured. Bus 1263 can also use common conductive lines for providing one or more of address, data, or control, the use of which can be regulated by controller 1262. Bus 1263 can be configured such that the components of system 1200 are distributed. Such distribution can be arranged between downhole components such as transmitters and receivers of sensor tool 1205 and components that can be disposed on the surface. Alternatively, the components can be co-located such as on one or more collars of a drill string or on a wireline structure.

In various embodiments, peripheral devices 1267 can include displays, additional storage memory, and/or other control devices that may operate in conjunction with controller 1262 and/or memory 1264. In an embodiment, controller 1262 is a processor. Peripheral devices 1267 can be arranged with a display can be used with instructions stored in memory 1264 to implement a user interface to manage the operation of sensor tool 1205 and/or components distributed within system 1200. Such a user interface can be operated in conjunction with communications unit 1266 and bus 1263. Various components of system 1200 can be integrated with sensor tool 1205 such that processing identical to or similar to the processing schemes discussed with respect to various embodiments herein can be performed downhole in the vicinity of the measurement.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium includes a machine-readable medium or computer readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM). Magnetic Random Access Memory (MRAM), phase change memory, etc., as well as all other structures designed to store information of any type for later retrieval.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

Figure 13:
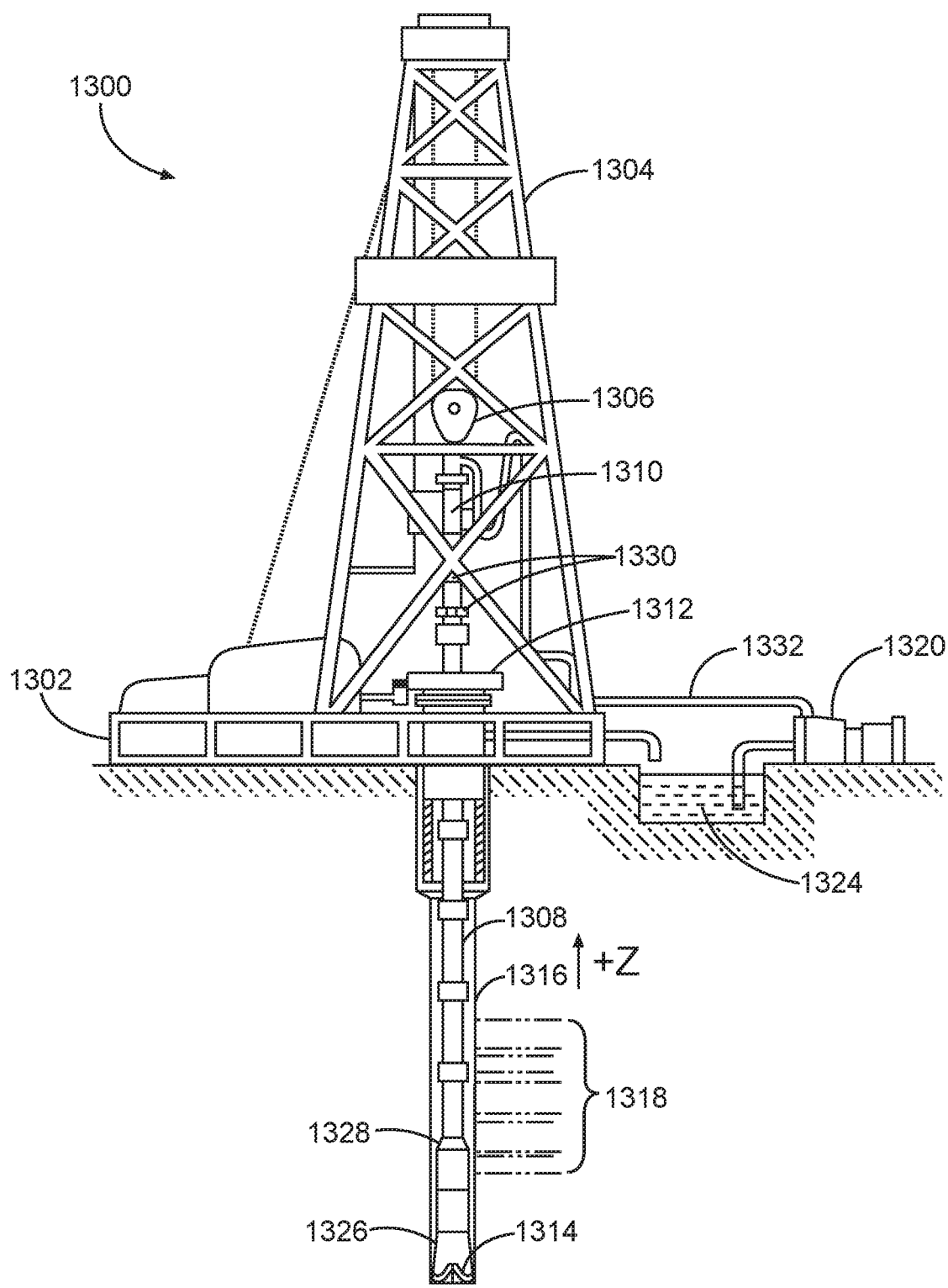
FIG. 13 illustrates generally an example of a drilling apparatus, such as including a measure-while-drilling (MWD) or log-while-drilling (LWD) capability.

FIG. 13 illustrates generally an example of a drilling apparatus 1300, such as including a measure-while-drilling (MWD) or log-while-drilling (LWD) capability. The illustrative example of FIG. 13 may include apparatus such as shown in FIG. 3, or may be used with techniques discussed in relation to FIGS. 4-9. A drilling rig or platform 1302 generally includes a derrick 1304 or other supporting structure, such as including or coupled to a hoist 1306. The hoist 1306 may be used for raising or lowering equipment or other apparatus such as drill string 1308. The drill string 1308 may access a borehole 1316, such as through a well head 1312. The lower end of the drill string 1308 may include various apparatus, such as a drill head 1314, such as to provide the borehole 1316.

A drilling fluid or "mud" may be circulated in the annular region around the drill head 1314 or elsewhere, such as provided to the borehole 1316 through a supply pipe 1322, circulated by a pump 1320, and returning to the surface to be captured in a retention pit 1324 or sump. Various subs or tool assemblies may be located along the drill string 1308, such as include a bottom hole assembly (BHA) 1326 or a second sub 1328.

As the BHA 1326 or second sub 1328 pass through various regions of a formation 1318, information may be obtained. For example, the BHA 1326, or the second sub 1328, may include apparatus such as shown in the examples of FIG. 3, such as to obtain a depth measurement. The second sub 1328 may include wireless telemetry or logging capabilities, or both, such as to transmit or later provide information indicative of a formation resistivity to operators on the surface or for later access in evaluation of formation 1318 properties, including depth. For example, portions 1330 of the apparatus 1300 at the surface may include one or more of wireless telemetry, processor circuitry, or memory facilities, such as to support log-while-drilling (LWD) or measurement-while-drilling (MWD) operations.

Figure 14:
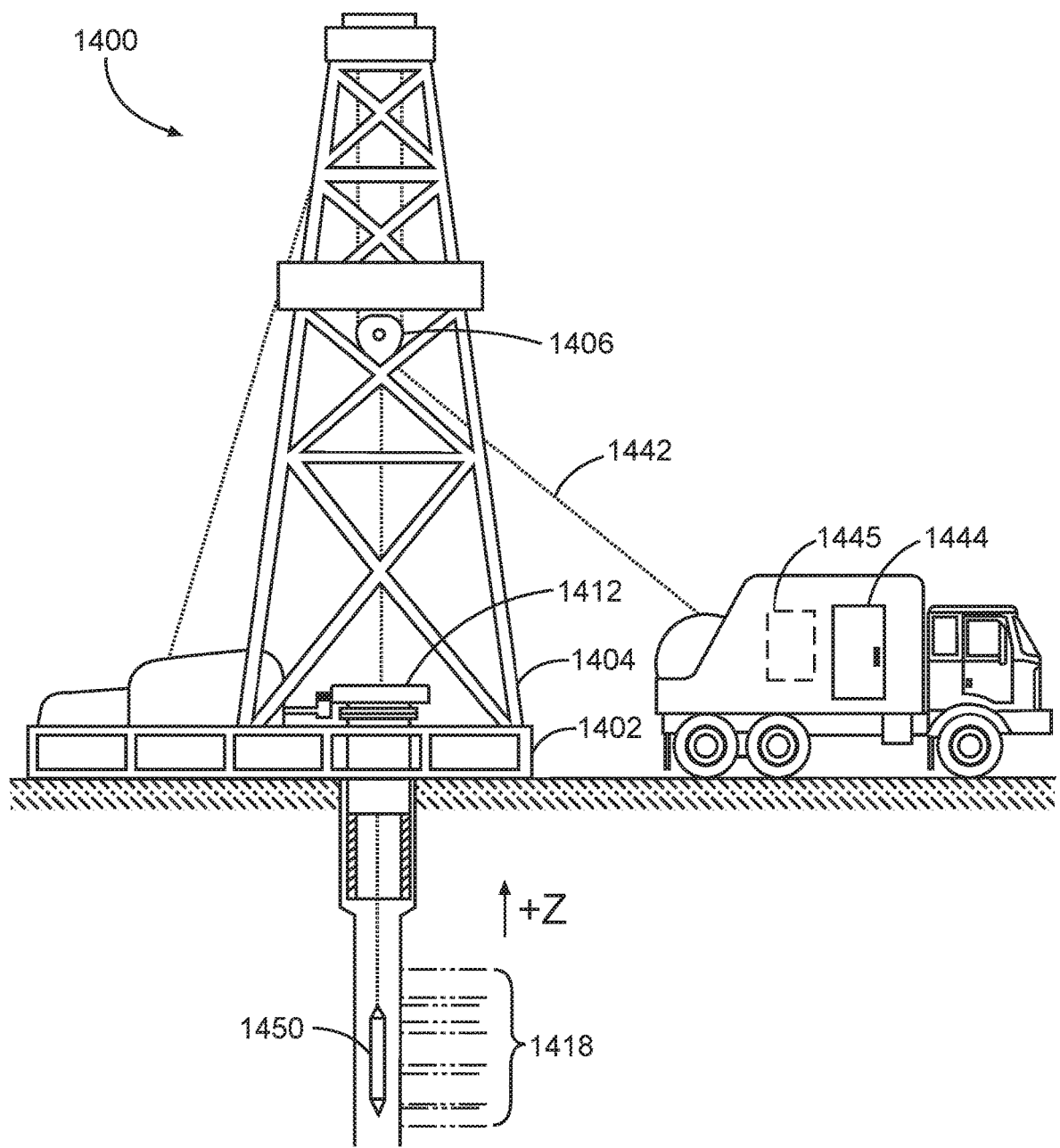
FIG. 14 illustrates generally an example of a wireline logging apparatus.

FIG. 14 illustrates generally an example of a wireline logging apparatus. The illustrative example of FIG. 14 may include apparatus such as shown in FIG. 3, or may be used with techniques discussed in relation to FIGS. 4-9. Similar to the example of FIG. 13, a hoist 1406 may be included as a portion of a platform 1402, such as coupled to a derrick 1404, and used to raise or lower equipment such as a wireline sonde 1450 into or out of a borehole. In this wireline example, a cable 1442 may provide a communicative coupling between a logging facility 1444 (e.g., including a processor circuit 1445 or other storage or control circuitry) and the sonde 1450. In this manner, information about the formation 1418 may be obtained, such as using an array laterolog tool included as at least a portion of the sonde 1450 as discussed in other examples herein.

For purposes of illustration, the examples of FIGS. 13 and 14 show a vertically-oriented borehole configuration. However, the apparatus and techniques described herein may also be used in other borehole configurations, such as a borehole including a horizontal penetration direction, or an oblique borehole configuration, for example. The examples of FIGS. 13 and 14 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

To better illustrate the apparatus and method for aligning downhole measurements disclosed herein, a non-limiting list of examples is provided:

Example 1 can include a method of aligning a plurality of downhole electromagnetic measurements, comprising: activating, at an initial recording time, a first transmitter antenna in an arrangement along a longitudinal axis, the first transmitter antenna activated at an operating frequency; activating, at the initial recording time, a second transmitter antenna in the arrangement, the second transmitter antenna disposed longitudinally from the first transmitter antenna along the longitudinal axis, the second transmitter antenna activated at substantially the same operating frequency as the first transmitter antenna; collecting at a first receiver antenna a first plurality of azimuthal measurements associated with the first transmitter antenna; collecting at a second receiver antenna a second plurality of azimuthal measurements associated with the second transmitter antenna; processing the first plurality of azimuthal measurements to produce a corresponding first plurality of higher order mode signals; processing the second plurality of azimuthal measurements to produce a corresponding second plurality of higher order mode signals; and aligning the first plurality of higher order mode signals and the second plurality of higher order mode signals in the time-domain by a time-shift.

Example 2 can include, or can optionally be combined with the subject matter of Example 1, wherein the first and second transmitter antennas are separated by the first and second receiver antennas and arranged along the longitudinal axis of a tool with the first transmitter antenna, the second transmitter antenna, the first receiver antenna, and the second receiver antenna having a non-zero angle with respect to the longitudinal axis.

Example 3 can include, or can optionally be combined with the subject matter of one or any combination of Examples 1-2, wherein a first longitudinal distance from the first transmitter antenna to the first receiver antenna is substantially equal to a second longitudinal distance from the second transmitter antenna to the second receiver antenna.

Example 4 can include, or can optionally be combined with the subject matter of one or any combination of Examples 1-3, wherein the operating frequency is selected according to the first or second longitudinal distance.

Example 5 can include, or can optionally be combined with the subject matter of one or any combination of Examples 1-4, wherein the first transmitter antenna and the first receiver antenna are spaced approximately equidistant from a first reference point, wherein the first plurality of higher order mode signals is associated with the first reference point; and the second transmitter antenna and the second receiver antenna are spaced approximately equidistant from a second reference point, wherein the second plurality of higher order mode signals is associated with the second reference point.

Example 6 can include, or can optionally be combined with the subject matter of one or any combination of Examples 1-5, wherein the first and second plurality of azimuthal measurements are collected over a predetermined time interval.

Example 7 can include, or can optionally be combined with the subject matter of one or any combination of Examples 1-6, wherein the aligning further comprises: identifying a similarity as an identified similarity between the first plurality of higher order mode signals and the second plurality of higher order mode signals; and time-shifting the first or second plurality of higher order mode signals such that the identified similarity corresponds to the time-domain of either the first plurality of higher order mode signals or the second plurality of higher order mode signals.

Example 8 can include, or can optionally be combined with the subject matter of one or any combination of Examples 1-7, wherein the aligning further comprises: determining a common parameter, including at least one of a slope, a peak, or a sample variance, of at least a portion of the first plurality of higher order mode signals and at least a portion of the second plurality of higher order mode signals; and correlating the portion of the first plurality of higher order mode signals and the portion of the second plurality of higher order mode signals in the time-domain based on the common parameter.

Example 9 can include, or can optionally be combined with the subject matter of one or any combination of Examples 1-8, obtaining, at a drill bit, a drill bit depth measurement at approximately the initial recording time.

Example 10 can include, or can optionally be combined with the subject matter of one or any combination of Examples 1-9, obtaining the drill bit depth measurement over the predetermined time interval.

Example 11 can include, or can optionally be combined with the subject matter of one or any combination of Examples 1-10, wherein a longitudinal distance between the drill bit and at least one of the first or second reference points is predetermined Example 12 can include, or can optionally be combined with the subject matter of one or any combination of Examples 1-11, correlating a depth of at least one of the first or second reference points with the drill bit depth measurement.

Example 13 can include, or can optionally be combined with the subject matter of one or any combination of Examples 1-12, correlating the time-shift to a distance between the first and second reference points so as to determine a velocity of the tool.

Example 14 can include a method of aligning a plurality of downhole electromagnetic measurements, comprising: activating, at an initial recording time and an operating frequency, a first transmitter antenna in an arrangement along a longitudinal axis, the first transmitter antenna tilted with respect to the longitudinal axis; activating, at the initial recording time and a substantially similar operating frequency, a second transmitter antenna in the arrangement, the second transmitter antenna disposed longitudinally from the first transmitter antenna along the longitudinal axis, the second transmitter antenna tilted with respect to the longitudinal axis; collecting, at a receiver antenna, a first plurality of azimuthal measurements associated with the first transmitter antenna, and a second plurality of azimuthal measurements associated with the second transmitter antenna, wherein the first plurality of azimuthal measurements and the second plurality of azimuthal measurements are offset from each other in the time-domain, wherein the receiver antenna is located between the first and second transmitter antennas, the receiver antenna tilted with respect to the longitudinal axis:
processing the first plurality of azimuthal measurements to produce a corresponding first plurality of higher order mode signals; processing the second plurality of azimuthal measurements to produce a corresponding second plurality of higher order mode signals; and aligning the first plurality of higher order mode signals and the second plurality of higher order mode signals in the time-domain.

Example 15 can include, or can optionally be combined with the subject matter of Example 14, wherein the arrangement includes the first and second transmitter antennas separated by the receiver antenna, wherein a first longitudinal distance from the first transmitter antenna to the receiver antenna is substantially equal to a second longitudinal distance from the second transmitter antenna to the receiver antenna, such that the receiver antenna is located at a longitudinal center point.

Example 16 can include, or can optionally be combined with the subject matter of one or any combination of Examples 14-15, wherein the operating frequency is selected according to the first or second longitudinal distance.

Example 17 can include, or can optionally be combined with the subject matter of one or any combination of Examples 14-16, wherein: the first transmitter antenna and the receiver antenna are spaced approximately equidistant from a first reference point, wherein the first plurality of higher order mode signals is associated with the first reference point; and the second transmitter antenna and the receiver antenna are spaced approximately equidistant from a second reference point, wherein the second plurality of higher order mode signals is associated with the second reference point.

Example 18 can include, or can optionally be combined with the subject matter of one or any combination of Examples 14-17, wherein the first and second plurality of azimuthal measurements are collected over a predetermined time interval.

Example 19 can include, or can optionally be combined with the subject matter of one or any combination of Examples 14-18, wherein the aligning further comprises: identifying a similarity as an identified similarity between the first plurality of higher order mode signals and the second plurality of higher order mode signals; and time-shifting the first or second plurality of higher order mode signals such that the identified similarity of the first and the second plurality of higher order mode signals corresponds in the time-domain of either the first plurality of higher order mode signals or the second plurality of higher order mode signals.

Example 20 can include, or can optionally be combined with the subject matter of one or any combination of Examples 14-19, wherein the aligning further comprises: determining a common parameter, including at least one of a slope, a peak, or a sample variance, of at least a portion of the first plurality of higher order mode signals and at least a portion of the second plurality of higher order mode signals; and correlating the portion of the first plurality of higher order mode signals and the portion of the second plurality of higher order mode signals in the time-domain based on the common parameter.

Example 21 can include, or can optionally be combined with the subject matter of one or any combination of Examples 14-20, obtaining, at a drill bit, a drill bit depth measurement at approximately the initial recording time.

Example 22 can include, or can optionally be combined with the subject matter of one or any combination of Examples 14-21, obtaining the drill bit depth measurement over the predetermined time interval.

Example 23 can include, or can optionally be combined with the subject matter of one or any combination of Examples 14-22, wherein a longitudinal distance between the drill bit and at least one of the first or second reference points is known.

Example 24 can include, or can optionally be combined with the subject matter of one or any combination of Examples 14-23, correlating the depth of at least one of the first or second reference points with the drill bit depth.

Example 25 can include, or can optionally be combined with the subject matter of one or any combination of Examples 14-24, correlating the time-shift to a distance between the first and second reference points so as to determine a velocity of a tool.

Example 26 can include, or can optionally be combined with the subject matter of one or any combination of Examples 14-25, processing the aligned first and second plurality of higher order mode signals to provide a formation resistivity measurement.

Example 27 can include, or can optionally be combined with the subject matter of one or any combination of Examples 14-26, wherein the method is conducted during a logging-while-drilling operation.

Example 28 can include a machine-readable storage medium having instructions stored thereon, which, when, performed by a machine, cause the machine to perform the method of with the subject matter of one or any combination of Examples 1-27.

Example 29 can include an apparatus to align a plurality of downhole electromagnetic measurements, comprising: a tool having an arrangement of transmitter antennas and receiver antennas, each transmitter antenna configured to operate at a substantially similar operating frequency, along a longitudinal axis of the tool, the tool including: a first and a second tilted transmitter antenna, the first tilted transmitter antenna disposed longitudinally above the second tilted transmitter antenna; a first tilted receiver antenna disposed a predetermined first distance from the first tilted transmitter antenna, the first tilted transmitter antenna and the first tilted receiver antenna spaced approximately equidistant from a first reference point; and a second tilted receiver antenna disposed a predetermined second distance from the second tilted transmitter antenna, the second tilted transmitter antenna and the second tilted receiver antenna spaced approximately equidistant from a second reference point, wherein the first and second reference points are disposed a predetermined third distance from each other; a drill bit, including a depth measurement device, wherein the depth measurement device is located at a fourth distance from at least one of the first or second reference points; and a processing unit configured to control activation of the transmitter antennas and the receiver antennas and to process a first plurality of electromagnetic measurements associated with the first reference point and a second plurality of electromagnetic measurements associated with the second reference point.

Example 30 can include the subject matter of Example 29 wherein the processing unit is configured to operate according to one or any combination of Examples 1-28.

Example 31 can include an apparatus to align a plurality of downhole electromagnetic measurements, comprising: a first transmitter antenna located along a longitudinal axis of a tool, the first transmitter antenna configured to operate at a first operating frequency, the first transmitter antenna tilted with respect to the longitudinal axis; a second transmitter antenna located along the longitudinal axis of the tool, the second transmitter antenna configured to operate at substantially the same operating frequency, the second transmitter antenna tilted with respect to the longitudinal axis; a receiver antenna located along the longitudinal axis and tilted with respect to the longitudinal axis, the receiver antenna disposed a first distance from the first transmitter antenna, a first reference point being located along the first distance and approximately equidistant from the first transmitter and the receiver antenna, the receiver antenna disposed at a second distance, substantially equal to the first distance, from the second transmitter antenna, a second reference point being located along the second distance and approximately equidistant from the second transmitter and the receiver antenna, the receiver antenna configured to provide a first plurality of electromagnetic measurements associated with the first reference point and a second plurality of electromagnetic measurements associated with the second reference point; and a drill bit, including a depth measurement device, wherein the depth measurement device is a located at a predetermined distance from at least one of the first or second reference points; and a processing unit configured to control activation of the transmitter antennas and receiver antennas and to process the first and second plurality of electromagnetic measurements associated with the transmitter antennas and receiver antennas.

Example 32 can include the subject matter of Example 31 wherein the processing unit is configured to operate according to one or any combination of Examples 1-28.

Example 33 can include a method of aligning a plurality of downhole electromagnetic measurements, comprising: obtaining a drill bit depth of a drill bit at an initial recording time; collecting a first plurality of electromagnetic measurements at an operating frequency from a first tilted transmitter antenna and a first tilted receiver antenna, separated from each other by a first longitudinal distance and disposed approximately equidistant about a first reference point, the first reference point located at a second longitudinal distance from the drill bit; collecting a second plurality of electromagnetic measurements, at substantially the same operating frequency, from a second tilted transmitter antenna and a second tilted receiver antenna, separated by substantially the same first longitudinal distance and disposed approximately equidistant from a second reference point, different than the first reference point; collecting a third plurality of electromagnetic measurements, at substantially the same operating frequency, from a third tilted transmitter antenna and a third tilted receiver antenna, separated by substantially the same first longitudinal distance and disposed approximately equidistant about a third reference point, different than the first and second reference points; processing the first, second, and third plurality of electromagnetic measurements to produce a corresponding first, second, and third plurality of higher order mode signals, respectively; determining a depth of the first reference point, based on the drill bit depth at the initial recording time and the second distance; aligning the first plurality of higher order mode signals with the second plurality of higher order mode signals in the time-domain by a first time-shift; and aligning the first plurality of higher order mode signals with the third plurality of higher order mode signals in the time-domain by a second time-shift.

Example 34 can include, or can optionally be combined with the subject matter of Example 33, wherein aligning the first plurality of higher order mode signals with second plurality of higher mode signals includes: determining a common parameter, including at least one of a slope, a peak, or a sample variance, of at least a portion of the first plurality of higher order mode signals and at least a portion of the second plurality of higher order mode signals; and correlating the portion of the first plurality of higher order mode signals and the portion of the second plurality of higher order mode signals in the time-domain based on the common parameter.

Example 35 can include, or can optionally be combined with the subject matter of one or any combination of Examples 33-34, wherein aligning the first plurality of higher order mode signals with the third plurality of higher mode signals includes: determining a common parameter, including at least one of a slope, a peak, or a sample variance, of at least a portion of the first plurality of higher order mode signals and at least a portion of the third plurality of higher order mode signals; and correlating the portion of the first plurality of higher order mode signals and the portion of the third plurality of higher order mode signals in the time-domain based on the common parameter.

Example 36 can include, or can optionally be combined with any portion or combination of portions of any one or more of Examples 1-35 to include, subject matter of the present apparatus and method for aligning downhole measurements.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The embodiments are submitted with the understanding that they will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method of aligning a plurality of downhole electromagnetic measurements, comprising:
   activating, at an initial recording time, a first transmitter antenna in an arrangement along a longitudinal axis, the first transmitter antenna activated at an operating frequency;
   activating, at the initial recording time, a second transmitter antenna in the arrangement, the second transmitter antenna disposed longitudinally from the first transmitter antenna along the longitudinal axis, the second transmitter antenna activated at substantially the same operating frequency as the first transmitter antenna:
   collecting at a first receiver antenna a first plurality of azimuthal measurements associated with the first transmitter antenna;
   collecting at a second receiver antenna a second plurality of azimuthal measurements associated with the second transmitter antenna;
   processing the first plurality of azimuthal measurements to produce a corresponding first plurality of higher order mode signals;
   processing the second plurality of azimuthal measurements to produce a corresponding second plurality of higher order mode signals;
   accumulating the first plurality higher order mode signals while the first transmitter antenna and the first receiver antenna are moved downhole, to form a first accumulated signal;
   accumulating the second plurality higher order mode signals while the second transmitter antenna and the second receiver antenna are moved downhole to form a second accumulated signal; and
   aligning the first plurality of higher order mode signals and the second plurality of higher order mode signals in the time-domain by a time-shift based on the first accumulated signal and the second accumulated signal.

2. The method of claim 1, wherein the first and second transmitter antennas are separated by the first and second receiver antennas and arranged along the longitudinal axis of a tool with the first transmitter antenna, the second transmitter antenna, the first receiver antenna, and the second receiver antenna having a non-zero angle with respect to the longitudinal axis.

3. The method of claim 2, wherein a first longitudinal distance from the first transmitter antenna to the first receiver antenna is substantially equal to a second longitudinal distance from the second transmitter antenna to the second receiver antenna.

4. The method of claim 3, wherein the operating frequency is selected according to the first or second longitudinal distance.

5. The method of claim 1, wherein:
   the first transmitter antenna and the first receiver antenna are spaced approximately equidistant from a first reference point, wherein the first plurality of higher order mode signals is associated with the first reference point; and
   the second transmitter antenna and the second receiver antenna are spaced approximately equidistant from a second reference point wherein the second plurality of higher order mode signals is associated with the second reference point.

6. The method of claim 1, wherein the first and second plurality of azimuthal measurements are collected over a predetermined time interval.

7. The method of claim 1 wherein the aligning further comprises:
   identifying a similarity as an identified similarity between the first plurality of higher order mode signals and the second plurality of higher order mode signals; and
   time-shifting the first or second plurality of higher order mode signals such that the identified similarity corresponds to the time-domain of either the first plurality of higher order mode signals or the second plurality of higher order mode signals.

8. The method of claim 1, wherein the aligning further comprises:
   determining a common parameter, including at least one of a slope, a peak, or a sample variance, of at least a portion of the first plurality of higher order mode signals and at least a portion of the second plurality of higher order mode signals; and
   correlating the portion of the first plurality of higher order mode signals and the portion of the second plurality of higher order mode signals in the time-domain based on the common parameter.

9. The method of claim 1, further comprising:
   obtaining, at a drill bit, a drill bit depth measurement at approximately the initial recording time.

10. The method of claim 9, further comprising obtaining the drill bit depth measurement over the predetermined time interval.

11. The method of claim 9, wherein a longitudinal distance between the drill bit and at least one of the first or second reference points is predetermined.

12. The method of claim 9, further comprising:
   correlating a depth of at least one of the first or second reference points with the drill bit depth measurement.

13. The method of claim 5, further comprising:
   correlating the time-shift to a distance between the first and second reference points so as to determine a velocity of the tool.

14. A method of aligning a plurality of downhole electromagnetic measurements, comprising:
   activating, at an initial recording time and an operating frequency, a first transmitter antenna in an arrangement along a longitudinal axis, the first transmitter antenna tilted with respect to the longitudinal axis;

activating, at the initial recording time and a substantially similar operating frequency, a second transmitter antenna in the arrangement, the second transmitter antenna disposed longitudinally from the first transmitter antenna along the longitudinal axis, the second transmitter antenna tilted with respect to the longitudinal axis;

collecting, at a receiver antenna, a first plurality of azimuthal measurements associated with the first transmitter antenna, and a second plurality of azimuthal measurements associated with the second transmitter antenna, wherein the first plurality of azimuthal measurements and the second plurality of azimuthal measurements are offset from each other in the time-domain, wherein the receiver antenna is located between the first and second transmitter antennas, the receiver antenna tilted with respect to the longitudinal axis;

processing the first plurality of azimuthal measurements to produce a corresponding first plurality of higher order mode signals;

processing the second plurality of azimuthal measurements to produce a corresponding second plurality of higher order mode signals;

accumulating the first plurality higher order mode signals while the first transmitter antenna and the first receiver antenna are moved downhole, to form a first accumulated signal;

accumulating the second plurality higher order mode signals while the second transmitter antenna and the second receiver antenna are moved downhole to form a second accumulated signal; and aligning the first plurality of higher order mode signals and the second plurality of higher order mode signals in the time-domain by a time-shift based on the first accumulated signal and the second accumulated signal.

15. The method of claim 14, wherein the arrangement includes the first and second transmitter antennas separated by the receiver antenna, wherein a first longitudinal distance from the first transmitter antenna to the receiver antenna is substantially equal to a second longitudinal distance from the second transmitter antenna to the receiver antenna, such that the receiver antenna is located at a longitudinal center point.

16. The method of claim 15, wherein the operating frequency is selected according to the first or second longitudinal distance.

17. The method of claim 14, wherein:
the first transmitter antenna and the receiver antenna are spaced approximately equidistant from a first reference point, wherein the first plurality of higher order mode signals is associated with the first reference point; and
the second transmitter antenna and the receiver antenna are spaced approximately equidistant from a second reference point, wherein the second plurality of higher order mode signals is associated with the second reference point.

18. The method of claim 14, wherein the first and second plurality of azimuthal measurements are collected over a predetermined time interval.

19. The method of claim 14, wherein the aligning further comprises:
identifying a similarity as an identified similarity between the first plurality of higher order mode signals and the second plurality of higher order mode signals; and time-shifting the first or second plurality of higher order mode signals such that the identified similarity of the first and the second plurality of higher order mode signals corresponds in the time-domain of either the first plurality of higher order mode signals or the second plurality of higher order mode signals.

20. The method of claim 14, wherein the aligning further comprises:
determining a common parameter, including at least one of a slope, a peak, or a sample variance, of at least a portion of the first plurality of higher order mode signals and at least a portion of the second plurality of higher order mode signals; and
correlating the portion of the first plurality of higher order mode signals and the portion of the second plurality of higher order mode signals in the time-domain based on the common parameter.

21. The method of claim 14, further comprising:
obtaining, at a drill bit, a drill bit depth measurement at approximately the initial recording time.

22. The method of claim 21, further comprising:
obtaining the drill bit depth measurement over the predetermined time interval.

23. The method of claim 17, wherein a longitudinal distance between the drill bit and at least one of the first or second reference points is known.

24. The method of claim 23, further comprising:
correlating the depth of at least one of the first or second reference points with the drill bit depth.

25. The method of claim 17, further comprising:
correlating the time-shift to a distance between the first and second reference points so as to determine a velocity of a tool.

26. The method of claim 14, further comprising:
processing the aligned first and second plurality of higher order mode signals to provide a formation resistivity measurement.

27. The method of claim 14, wherein the method is conducted during a logging-while-drilling operation.

28. A non-transitory machine-readable storage medium having instructions stored thereon, which, when, performed by a machine, cause the machine to perform the method of claim 14.

29. An apparatus to align a plurality of downhole electromagnetic measurements, comprising:
a tool having an arrangement of transmitter antennas and receiver antennas, each transmitter antenna configured to operate at a substantially similar operating frequency, along a longitudinal axis of the tool, the tool including:
a first and a second tilted transmitter antenna, the first tilted transmitter antenna disposed longitudinally above the second tilted transmitter antenna;
a first tilted receiver antenna disposed a predetermined first distance from the first tilted transmitter antenna, the first tilted transmitter antenna and the first tilted receiver antenna spaced approximately equidistant from a first reference point; and
a second tilted receiver antenna disposed a predetermined second distance from the second tilted transmitter antenna, the second tilted transmitter antenna and the second tilted receiver antenna spaced approximately equidistant from a second reference point, wherein the first and second reference points are disposed a predetermined third distance from each other;

a drill bit including a depth measurement device, wherein the depth measurement device is located at a fourth distance from at least one of the first or second reference points; and a processing unit configured to control activation of the transmitter antennas and the receiver antennas and to process a first plurality of electromagnetic measurements associated with the first reference point and a second plurality of electromagnetic measurements associated with the second reference point to produce, respectively, a first plurality of higher order mode signals and a second plurality of higher order mode signals, the processing unit further configured to accumulate the first plurality of higher order mode signals, while the first tilted transmitter antenna and the first tilted receiver antenna are moved downhole, to form a first accumulated signal accumulate the second plurality of higher order mode signals while the second tilted transmitter antenna and the second tilted receiver antenna are moved downhole to form a second accumulated signal, and align the first plurality of higher order mode signals and the second plurality of higher order mode signals in the time-domain by a time-shift based on the first accumulated signal and the second accumulated signal.

30. An apparatus to align a plurality of downhole electromagnetic measurements, comprising:
a first transmitter antenna located along a longitudinal axis of a tool, the first transmitter antenna configured to operate at a first operating frequency, the first transmitter antenna tilted with respect to the longitudinal axis;
a second transmitter antenna located along the longitudinal axis of the tool, the second transmitter antenna configured to operate at substantially the same operating frequency, the second transmitter antenna tilted with respect to the longitudinal axis;
a receiver antenna located along the longitudinal axis and tilted with respect to the longitudinal axis, the receiver antenna disposed a first distance from the first transmitter antenna, a first reference point being located along the first distance and approximately equidistant from the first transmitter and the receiver antenna, the receiver antenna disposed at a second distance, substantially equal to the first distance, from the second transmitter antenna, a second reference point being located along the second distance and approximately equidistant from the second transmitter and the receiver antenna, the receiver antenna configured to provide a first plurality of electromagnetic measurements associated with the first reference point and a second plurality of electromagnetic measurements associated with the second reference point: and
a drill bit, including a depth measurement device, wherein the depth measurement device is a located at a predetermined distance from at least one of the first or second reference points; and
a processing unit configured to control activation of the transmitter antennas and receiver antennas and to process the first and second plurality of electromagnetic measurements associated with the transmitter antennas and receiver antennas, accumulate the first and second plurality of electromagnetic measurements, while the first and second transmitter and receiver antennas are moved downhole, to form first and second accumulated signals, and align the first and second plurality of electromagnetic measurements in the time-domain by a time-shift based on the first and second accumulated signals.

31. A method of aligning a plurality of downhole electromagnetic measurements, comprising:
obtaining a drill bit depth of a drill bit at an initial recording time;
collecting a first plurality of electromagnetic measurements at an operating frequency from a first tilted transmitter antenna and a first tilted receiver antenna, separated from each other by a first longitudinal distance and disposed approximately equidistant about a first reference point, the first reference point located at a second longitudinal distance from the drill bit:
collecting a second plurality of electromagnetic measurements, at substantially the same operating frequency, from a second tilted transmitter antenna and a second tilted receiver antenna, separated by substantially the same first longitudinal distance and disposed approximately equidistant from a second reference point, different than the first reference point
collecting a third plurality of electromagnetic measurements, at substantially the same operating frequency, from a third tilted transmitter antenna and a third tilted receiver antenna, separated by substantially the same first longitudinal distance and disposed approximately equidistant about a third reference point different than the first and second reference points;
processing each of the first, second, and third plurality of electromagnetic measurements to produce a corresponding first, second, and third plurality of higher order mode signals, respectively;
determining a depth of the first reference point, based on the drill bit depth at the initial recording time and the second distance:
accumulating each of the first, second, and third plurality of higher order mode signals while the second transmitter antenna and the second receiver antenna are moved downhole to form, respectively, first, second, and third accumulated signals; and
aligning the first plurality of higher order mode signals with the second and third plurality of higher order mode signals in the time-domain by a time-shift based on the first, second, and third accumulated signals.

32. The method of claim 31, wherein aligning the first plurality of higher order mode signals with second plurality of higher mode signals includes:
determining a common parameter, including at least one of a slope, a peak, or a sample variance, of at least a portion of the first plurality of higher order mode signals and at least a portion of the second plurality of higher order mode signals; and
correlating the portion of the first plurality of higher order mode signals and the portion of the second plurality of higher order mode signals in the time-domain based on the common parameter.

33. The method of claim 31, wherein aligning the first plurality of higher order mode signals with the third plurality of higher mode signals includes:
determining a common parameter, including at least one of a slope, a peak, or a sample variance, of at least a portion of the first plurality of higher order mode signals and at least a portion of the third plurality of higher order mode signals; and correlating the portion of the first plurality of higher order mode signals and the portion of the third plurality of higher order mode signals in the time-domain based on the common parameter.

\* \* \* \* \*